(12) United States Patent
Nakajima et al.

(10) Patent No.: US 7,709,981 B2
(45) Date of Patent: May 4, 2010

(54) STATOR, MOTOR AND RECORD MEDIUM DRIVE APPARATUS AND METHOD OF FABRICATING STATOR

(75) Inventors: Masahiro Nakajima, Chiba (JP); Akiko Ishikura, Chiba (JP); Naoki Kawawada, Chiba (JP); Norio Chiba, Chiba (JP)

(73) Assignee: Seiko Instruments Inc. (JP)

( * ) Notice: Subject to any disclaimer, the term of this patent is extended or adjusted under 35 U.S.C. 154(b) by 360 days.

(21) Appl. No.: 11/975,280

(22) Filed: Oct. 18, 2007

(65) Prior Publication Data

US 2008/0100171 A1 May 1, 2008

(30) Foreign Application Priority Data

Oct. 26, 2006 (JP) ............................. 2006-291039
Aug. 31, 2007 (JP) ............................. 2007-226564

(51) Int. Cl.
*H02K 11/00* (2006.01)
(52) U.S. Cl. ..................... 310/71; 310/67 R; 310/254.1
(58) Field of Classification Search .................. 310/71, 310/67 R, 68 R, 89, 254.1, 216.004; 29/596
See application file for complete search history.

(56) References Cited

U.S. PATENT DOCUMENTS

| | | | |
|---|---|---|---|
| 4,658,162 A * | 4/1987 | Koyama et al. ............ 310/68 R |
| 4,804,574 A * | 2/1989 | Osawa et al. ................. 428/209 |
| 5,900,687 A * | 5/1999 | Kondo et al. .................... 310/71 |
| 6,265,800 B1 * | 7/2001 | Kimura et al. ............... 310/152 |
| 6,559,565 B2 * | 5/2003 | Iwai et al. .................. 310/68 B |
| 6,943,984 B2 * | 9/2005 | Amano et al. ............. 360/99.07 |
| 6,950,276 B2 * | 9/2005 | Fujita et al. .............. 360/99.08 |
| 2002/0105244 A1 * | 8/2002 | Wauke ........................ 310/180 |
| 2002/0153786 A1 * | 10/2002 | Iwai et al. .................. 310/68 B |
| 2003/0227712 A1 * | 12/2003 | Nakano et al. ........... 360/99.08 |
| 2005/0285470 A1 * | 12/2005 | Itoh et al. .................... 310/208 |
| 2006/0043802 A1 * | 3/2006 | Sugiyama et al. ......... 310/67 R |

FOREIGN PATENT DOCUMENTS

JP 2004023935 1/2004

* cited by examiner

*Primary Examiner*—Thanh Lam
(74) *Attorney, Agent, or Firm*—Adams & Wilks

(57) ABSTRACT

A stator includes a base board, a plurality of coil patterns patterned on one face of the base board, a stator core having a ring-like portion formed in a ring-like shape, a plurality of teeth base ends of which are fixed to the ring-like portion and front end portions formed respectively at front ends of the plurality of teeth in which the coil patterns and the teeth are laminated onto the base board to be respectively opposed to each other, and covers having base members bonded to the base board in a state of being respectively fitted to the plurality of teeth and covering surroundings of the respective teeth and conductive patterns patterned to inner faces of the base members and electrically connected to the coil patterns.

17 Claims, 22 Drawing Sheets

US 7,709,981 B2

STATOR, MOTOR AND RECORD MEDIUM DRIVE APPARATUS AND METHOD OF FABRICATING STATOR

BACKGROUND OF THE INVENTION

1. Field of the Invention

The present invention relates to a stator constituting a stator of a motor for driving to rotate a record medium of HD (hard disk) or the like, a motor having the stator and a record medium drive apparatus having the motor as well as a method of fabricating a stator.

2. Description of the Related Art

In recent years, an information recording/reproducing apparatus using a hard disk drive apparatus (HDD) has been started to be adopted in a portable music reproducing apparatus, a portable telephone or the like. Particularly, an information/recording reproducing apparatus of a portable type is going to constitute a main current in the future owing to its availability, and further small-sized formation and thinned formation have been requested. In accordance therewith, an improvement has been carried out for small-sized formation and thinned formation of a motor for driving HD (hard disk).

Here, a brief explanation will be given of a hard disk drive apparatus having a general motor in reference to FIG. 27 through FIG. 29. As shown by FIG. 27, the disk drive apparatus 40 includes a stator 43 having a coil 41 and a stator core 42, and a rotor 46 having a permanent magnet 44 and a hub 45. The hub 45 is supported by a sleeve 47 rotatably around an axis line L and formed with a fitting portion 45a fitted to a center hole of a disk D. Thereby, the hard disk D is fixed to the hub 45. Further, an outer periphery of the hub 45 is fixed with the permanent magnet 44 to be opposed to the stator core 42 to be spaced apart from each other by a predetermined distance.

The sleeve 47 is fixed to a base 48 and rotatably supports the hub 45. In this case, a more or less gap is ensured between the sleeve 47 and the hub 45, and the gap is filled with oil W. Further, an outer surface of the hub 45 or the sleeve 47 is pertinently formed with a radial dynamic pressure generating groove and a thrust dynamic pressure generating groove, not illustrated, referred to as a herringbone groove. Thereby, when the hub 45 is rotated around the axis line L, the hub 45 is rotated stably without being fluctuated in a thrust direction and a radial direction. That is, the hub 45 is brought into a state of being supported by a hydraulic dynamic bearing.

As shown by FIG. 28, the stator core 42 includes a core back 42a formed in a ring-like shape, and a plurality of teeth 42b formed to extend in a radius direction. Further, the stator core 42 is supported by a base 48 on a side of the core back 42a. The teeth 42b are formed at respective predetermined angles around the axis line L and formed such that a number (slot number) thereof constitutes a multiple of 3. For example, the teeth 42b are formed by 9 slots at respective 40 degrees. Further, the coils 41 are respectively wound at surroundings of the plurality of teeth 42b. In this case, the coils 41 are wound at every 3 (spaced apart by 2) thereof to constitute 3 phases (U phase, V phase, W phase).

When the hard disk D is driven by the disk drive apparatus 40 constituted in this way, first, the coil 41 is supplied with a three phase alternating current to generate a magnetic field in the coil 41. The magnetic field is operated to the permanent magnet 44 by way of the teeth 42b to rotate the rotor around the axis line L. Thereby, the disk D fixed to the rotor 46 by the fitting portion 45a can be rotated.

Meanwhile, as described above, further small-sized formation and thinned formation are requested for the motor in the future. However, as shown by FIG. 29, the coil 41 is wound at the surrounding to the tooth 42b by a predetermined turn number in order to ensure a constant electromotive force, and therefore, a thickness T1 is necessarily thickened. Therefore, it is difficult to achieve thinned formation as a whole. Particularly, the thickness T1 of the coil 41 is significant in comparison with the product constituted otherwise, and therefore, the thickness T1 effects a considerable influence on thinned formation. Therefore, in order to realize thinned formation, it is necessary to thin the coil 41 as thin as possible. However, as described above, the predetermined turn number is needed for ensuring the constant electromotive force, and therefore, the turn number of the coil 41 cannot simply be reduced.

Hence, although there is conceivable a method of reducing the turn number of the coil 41 wound per the single tooth 42b by increasing the number (slot number) of the teeth 42b, in this case, as shown by FIG. 28, with an increase in the slot number, a distance T2 between the teeth 42b is reduced. Here, in order to wind a coil wire around the tooth 42b, the coil wire is normally wound there around by inserting a coiling machine between the teeth 42b and orbiting the coiling machine centering on the tooth 42b. Therefore, when the distance T2 between the teeth 42b is made to be smaller than a rectified value, the coiling machine cannot be made to pass therethrough and the coil wire cannot be wound therearound. Therefore, the slot number cannot be increased to a necessary number and the number is limited. Therefore, the more amounted to the thinned formation of the total, the more difficult to thin the thickness T1 by extremely reducing the turn number of the coil 41 for the single tooth 42b.

On the other hand, there is known a disk drive apparatus achieving thinned formation as a whole by constituting a stator without mechanically winding a coil wire therearound (refer to, for example, Patent References 1 and 2).

As shown by FIG. 30 and FIG. 31, the disk drive apparatus 50 includes a metal core board 51 having a function of a core and windings of a motor and a function of a wiring board mounted with a part of IC or the like. The metal core board 51 constitutes a stator and is constituted by a tooth connecting portion, not illustrated, a tooth coil forming portion 51a, a tooth front end portion 51b, a wiring 51c and a through hole 51d.

The tooth connecting portion is constituted by laminated plates of thin plates and formed by a ring-like shape. The tooth coil forming portion 51a is a portion a base end side of which is fixed to the tooth connecting portion and which is formed by being extended to an inner side in a radius direction, and a portion in correspondence with the tooth of the background art. Normally, the tooth coil forming portion 51a is formed to constitute a number of pieces 1.5 times as much as a number of poles of a permanent magnet 52 formed in a ring-like shape. Further, a front end of the tooth coil forming portion 51a constitutes the tooth front end portion 51b to be opposed to the permanent magnet 52.

The wirings 51c are arranged at a surface and a rear face of the tooth coil forming portion 15a and is fixed by an insulating resin 53. Further, the insulating resin 53 is formed with the through hole 51d an inner face of which is plated by a metal and which electrically connects to the wirings 51c formed at the surface and the rear face. At this occasion, as shown by FIG. 31, the wirings 51c and the through holes 51d are connected to spirally surround the tooth coil forming portions 51a. Thereby, by making an electric current flow in the wiring 51c, a magnetic field for rotating the permanent magnet 52 can be generated.

According to the disk drive apparatus 50 including the metal core board 51 constituted in this way, the stator can be constituted without winding mechanically the coil wire around the tooth as in the related art, and therefore, the number of the tooth coil forming portions 51a, that is, the slot number can be increased without being conscious of the coiling machine. Therefore, the wiring 51c wound at the surrounding of the single tooth coil forming portion 51a can be reduced, and a thickness can be restrained as less as possible. Therefore, thinned formation as a whole can be achieved.

Patent Reference 1: JP-A-2004-23935

Patent Reference 2: JP-A-2004-32926

However, according to the related arts described in Patent References 1 and 2, the following problem still remains.

That is, since the insulating resin 53 is interposed between the tooth coil forming portion 51a and the wiring 51c, in comparison with the case of winding the coil wire, a total length thereof is prolonged. Further, the through hole 51d is bored by mechanical working or laser working, and therefore, a positional shift thereof with the wiring 51c is liable to be brought about. Therefore, it is difficult to arrange the through holes 51d by narrow intervals and the total length is further prolonged. As a result thereof, there is brought about a drawback that an electric resistance is increased, an efficiency of the electromotive force is deteriorated and power consumption is increased.

Further, owing to a structure in which a portion of the wiring 51c and the tooth coil forming portion 51a are embedded at inside of the insulating resin 53, there is a concern that heat generated by electricity conduction is not radiated to outside but is confined to inside. Therefore, exfoliation of a part is liable to be brought about, which amounts to a reduction in a power function and a reduction in a reliability.

In this way, even when the thinned formation can be achieved, a new drawback is brought about as a substitute therefor.

SUMMARY OF THE INVENTION

The invention has been carried out in consideration of such a situation and it is an object thereof to provide a stator capable of achieving thinned formation and achieving promotion of efficiency of an electromotive force and heat radiating performance, a motor having the stator and a record medium drive apparatus having the motor as well as a method of fabricating the stator.

The invention provides a following means in order to resolve the above-described problem.

According to the invention, there is provided a stator which is a stator arranged opposedly to a permanent magnet rotated along an axis line the stator comprising an insulating base board, a plurality of conductive coil patterns patterned onto one face of the base board at respective angles centering on the axis line, a stator core of a magnetic member including a ring-like portion formed in a ring-like shape centering on the axis line, a plurality of teeth base ends of which are fixed to the ring-like portion and which are formed to extend in a radius direction directed to the permanent magnet at the respective predetermined angles, and front end portions respectively formed at front ends of the plurality of teeth and opposed to a peripheral face of the permanent magnet, wherein the coil patterns and the teeth are laminated on the base board to be opposed to each other, an insulating layer coated on an outer surface of the stator core, and covers including insulating base members bonded to the base board in a state of being respectively fitted to the plurality of teeth laminated on the base board and covering surroundings of the respective teeth and conductive patterns patterned to inner faces of the base members and electrically connected to the coil patterns.

Further, according to the invention, there is provided a method of fabricating a stator which is a method of fabricating a stator opposedly arranged to a permanent magnet rotated around an axis line, the method comprising a base board working step of patterning a plurality of coil patterns on one face of an insulating base board at respective predetermined angles centering on the axis line by a conductive material, a stator core forming step of forming a stator core including a ring-like portion formed in a ring-like shape centering on the axis line, a plurality of teeth base ends of which are fixed to the ring-like portion and which are formed to extend in a radius direction directed to the permanent magnet at the respective angles, and front end portions respectively formed at front ends of the plurality of teeth and opposed to a peripheral face of the permanent magnet by working a flat plate of a magnetic member, a layer coating step of coating an insulating layer on an outer surface of the stator core, a base member working step of patterning a conductive pattern electrically connected to the coil pattern on an insulating base member by a conductive material and folding to form the base member in a state of constituting an inner face by the conductive pattern to thereby form a cover for surrounding a surrounding of the tooth when the base member is fitted to the tooth, a fixing step of fixing the base board and the stator core in a state of being laminated together such that the plurality of coil patterns and the plurality of teeth are opposed to each other, and a bonding step of fitting the cover to the teeth and electrically connecting the coil pattern and the conductive pattern while bonding the cover to the base board.

According to the stator and the method of fabricating the stator according to the invention, first, there is carried out the base board working step of patterning a plurality of coil patterns on one face of the base board by the conductive material of copper or the like. At this occasion, the plurality of coil patterns are patterned at the respective predetermined angles centering on the axis line in the peripheral direction of the base board.

There is carried out the stator core forming step of forming the stator at a timing the same as that of the base board working step, or a timing there before or thereafter. That is, the stator core comprising the ring-like portion and the plurality of teeth and the front end portions are formed by working a flat plate of a magnetic member of a silicon steel plate or the like. At this occasion, the plurality of teeth are formed by a number the same as that of the coil patterns at respective angles the same as the angles of forming the coil patterns. Further, after forming the stator core, the layer coating step is carried out to coat (coat) the insulating layer on the outer surface of the stator core.

Further, there is carried out the base member working step of forming the cover at timings the same as those of the respective steps or timings therebefore or thereafter. That is, the cover is formed by forming the conductive pattern by patterning the conductive material of copper or the like on the base member of polyimide or the like, thereafter, folding to form the base member by utilizing a die or the like in the state of constituting an inner side by the conductive pattern. At this occasion, the cover is formed by a size capable of fitting to cover the teeth of the stator core. Further, the plurality of covers are formed in accordance with a number of the teeth.

After all of the respective steps have been finished, first, there is carried out the fixing step of fixing the base board and the stator core. That is, after laminating the base board and the stator core such that the plurality of coil patterns and the plurality of teeth are respectively opposed to each other, the both members are fixed by adhering or the like. Thereby, there is brought about a state in which the teeth are respectively mounted on the plurality of coil patterns. Further, the stator core is brought into the laminated state in a state in which all of the ring-like portions, the teeth and the front end portions are brought into face contact with the base board.

After the fixing step has been finished, the covers are respectively fitted to the plurality of teeth laminated onto the base board. That is, the covers are fitted to cover the teeth. At this occasion, the inner face of the cover is patterned with the conductive pattern, and therefore, the conductive pattern is brought into a state of being brought into contact with the tooth. Further, after fitting the cover, the conductive pattern and the coil pattern are electrically connected while bonding the cover to the base board. By the electric connection, the coil pattern and the conductive pattern function as a coil for exciting the teeth by being spirally wound at the surrounding of the tooth.

An explanation will be given of a case of rotating the permanent magnet constituting a rotor by utilizing the stator fabricating in this way. When a predetermined current is supplied to the conductive pattern and the coil pattern, since these function as the coil, the tooth is excited to generate a magnetic field. By the magnetic field, the permanent magnet can be rotated around the axis line. Further, the stator cores respectively include the front end portions opposed to a peripheral face of the permanent magnet at front ends of the teeth, and therefore, delivery of a magnetic flux between the stator cores and the permanent magnet becomes dense. Therefore, the permanent magnet can efficiently be rotated.

Particularly, the coil pattern patterned to the baseboard and the conductive pattern patterned to the inner face of the cover can be functioned as the coil, and therefore, different from the constitution of forming the coil by mechanically winding the coil wire as in the related art, it is not necessary to use the coiling machine. Therefore, the stator core can be constituted to increase the number of teeth, that is, the slot number as much as possible. Therefore, the turn number of the coil per one tooth can be reduced and the thickness can be restrained as less as possible. Therefore, the thinned formation of the total can be achieved.

Further, the coil pattern and the conductive pattern are brought into a state of being brought into contact with the tooth by way of the insulating layer. Therefore, a wasteful gap is not formed between the coil pattern and the conductive pattern and the teeth. Therefore, after ensuring insulation between the coil pattern and the conductive pattern and the teeth, lengths of the coil pattern and the conductive pattern can be constituted by necessary minimum lengths, and an electric resistance can be restrained as less as possible. Therefore, the electromotive force can efficiently be generated and wasteful power consumption can be eliminated without reducing the reliability.

Further, one face of the stator core other than the tooth is exposed, and therefore, an exposure area exposed to the atmosphere is larger than that of the related art. Therefore, heat generated by electricity conduction can efficiently be radiated. Therefore, an operational failure or exfoliation of a part by heat or the like can be restrained from being brought about, and the reliability can be promoted.

Further, it is not necessary to utilize the coiling machine, and therefore, the gap between the contiguous front end portions can be made to be as small as possible. Therefore, a portion of a magnetic line of force flowing in the tooth can be made to flow to the contiguous tooth by way of the front end portion and the magnetic force by which the permanent magnet and the front end portion attract each other can be reduced. As a result, the cogging torque can be reduced, and the high performance formation can be achieved.

Further, the stator core is pressed to the base board by the cover after being fixed onto the baseboard over the ring-like portion, the teeth and the front end portions. Therefore, although the base end sides of the respective teeth are fixed to the ring-like portion in a cantilever state, the respective teeth are brought into a state of being connected to each other by way of the base board. Therefore, vibration of the respective teeth caused by influence of rotation of the permanent magnet can be restrained. When assumedly, the base end sides of the respective teeth are only fixed to the ring-like portions there is a concern of bringing about unnecessary vibration of fluctuating the respective teeth or the like by being influenced by rotation of the permanent magnet. However, according to the invention, such unnecessary vibration can be restrained as less as possible. Therefore, strange sound or the like can be eliminated as less as possible and durability can be promoted.

Further, according to the stator of the invention, there is provided the stator of the invention, wherein a pattern of one of the coil pattern or the conductive pattern is patterned such that respective electrically independent single pieces of wirings are aligned at constant intervals in the radius direction in a state of being skewed to the radius direction directed to the permanent magnet, the other pattern is patterned such that respective electrically independent single pieces of wirings are aligned at constant intervals to the radius direction in a state of being orthogonal to the radius direction directed to the permanent magnet, and both ends of respective wirings of the other pattern are electrically connected respectively to one ends and other ends of contiguous wirings of wirings of the one pattern.

Further, according to the method of fabricating the stator of the invention, there is provided the method of fabricating the stator of the invention, wherein in carrying out the base board working step and the base member working step, either one pattern of the coil pattern and the conductive pattern is formed by patterning the pattern such that respective electrically independent single pieces of wirings are aligned at constant intervals to the radius direction in a state of being skewed to the radius direction directed to the permanent magnet, the other pattern is formed by patterning the other pattern such that respective electrically independent single pieces of the wirings are aligned at constant intervals to the radius direction in a state of being orthogonal to the radius direction directed to the permanent magnet, and in the bonding step, both ends of the respective wirings of the other pattern are respectively electrically connected to one ends and other ends of contiguous wirings of the wirings of the one pattern to thereby function as the coil.

According to the stator and the method of fabricating the stator of the invention, when the coil pattern and the conductive pattern are formed by the base board working step and the base member working step, either of the patterns is formed by patterning the electrically independent single piece of the wirings are aligned at the constant intervals to the radius direction directed to the permanent magnet. At this occasion, the one pattern is patterned in a state of making the plurality of wirings skewed to the radius direction.

Further, the other pattern is formed by being patterned such that the electrically independent single pieces of the wirings are aligned at the constant intervals in the radius direction directed to the permanent magnet. At this occasion, different from the case of the above-described one pattern, the other pattern is patterned in the state of making the plurality of wirings orthogonal to the radius direction.

The coil pattern and the conductive pattern are respectively patterned as described above, and therefore, when the cover is fitted to cover the tooth, the both ends of the respective wirings of the other pattern (for example, conductive pattern) are brought into a state of being respectively brought into contact with the one ends and the other ends of the contiguous wirings in the wirings of the one pattern (for example, coil pattern). Therefore, in the bonding step, by electrically connecting the wiring of the coil pattern and the wiring of the conductive pattern, the surrounding of the tooth can be wound spirally to be able to function as the coil firmly.

Further, according to the stator of the invention, there is provided the stator of the invention, further comprising an insulating flexible board including a board main body formed with a through hole having a diameter substantially the same as an inner diameter of the ring-like portion, rings formed to be laminated to front end portions of the plurality of teeth, and a plurality of connecting portions both ends of which is connected to the board main body and the rings and which are formed to be laminated to the plurality of teeth for interposing the stator core between the flexible board and the base board, wherein the cover is fixed to the connecting portion.

Further, according to the method of fabricating the stator according to the invention, there is provided the method of fabricating the stator of the invention, further comprising a cover fixing step of preparing an insulating flexible board including a board main body formed with a through hole having a diameter substantially the same as an inner diameter of the ring-like portion, rings formed to be laminated to front end portions of the plurality of teeth, and a plurality of connecting portions both ends of which are connected to the board main body and the rings and which are formed to be laminated to the plurality of teeth, and fixing the cover to the connecting portion, wherein in the bonding step, the cover is bonded to the base board in a state of laminating the flexible board to the stator core such that the stator core is interposed between the flexible board and the base board.

According to the stator and the method of fabricating the stator of the invention, after forming the plurality of covers by the base member working step, there is carried out the cover fixing step of fixing the plurality of covers to the insulating flexible board constituted by the base main body and the ring and the connecting portion.

After the cover fixing step, the flexible board is laminated to the stator core such that the stator core is interposed between the flexible board and the base board. At this occasion, the respective connecting portions of the flexible board are fixed to the covers, and therefore, the plurality of covers can efficiently and successively be fitted to the plurality of teeth. That is, it is not necessary to fit the respective covers thereto one by one, and therefore, the covers can further efficiently be fitted thereto and the base board and the covers can be bonded in a short period of time. Therefore, the stator is facilitated to fabricate and a fabricating time period can be shortened.

Further, the board main body of the flexible board is formed with the through hole having the inner diameter substantially the same as that of the ring-like portion of the stator core, and therefore, when the flexible board and the stator core are laminated, the ring-like portion and the board main body are brought into the laminated state. Similarly, also with regard to the ring and the connecting portion, when the flexible board and the stator core are laminated, the ring and the connecting portion are respectively brought into a state of being respectively laminated to the front end portion and the tooth. Therefore, the stator core can be interposed between the flexible board and the base board to be fixed thereby, and the plurality of teeth and the front end portions can integrally and solidly be connected by way of the flexible board and the base board. Therefore, the respective teeth can further firmly be prevented from being vibrated by being influenced by rotation of the permanent magnet.

Further, according to the stator of the invention, there is provided the stator of the invention, further comprising an insulating flexible board including a board main body formed with a through hole having a diameter substantially the same as an inner diameter of the ring-like portion, rings formed to be laminated to front end portions of the plurality of teeth, and a plurality of connecting portions both ends of which are connected to the board main body and the rings and which are formed to be laminated to the plurality of teeth for interposing the stator core between the flexible board and the base board, wherein the cover is integrally formed with the connecting portion.

Further, according to the method of fabricating the stator of the invention, there is provided the method of fabricating the stator of the invention, wherein in the base member working step, after forming a flexible board having a board main body formed with a through hole having a diameter substantially the same as an inner diameter of the ring-like portion, rings formed to be laminated to the front end portions of the plurality of teeth and a plurality of connecting portions both ends of which are connected to the board main body and the rings and which are formed to be laminated to the plurality of teeth from the insulating base member, the conductive pattern is patterned to the connecting portion and carrying out the folding forming to thereby integrally form the connecting portion and the covers, in the bonding step, the cover is bonded to the base board in a state of laminating the flexible board to the stator core such that the stator core is interposed between the flexible board and the base board.

According to the stator and the method of fabricating the stator of the invention, when the base member working step is carried out, first, the flexible board constituted by the board main body and the ring and the connecting portion is formed from the insulating base member. Successively, the conductive patterns are patterned to the connecting portions formed to overlap the plurality of teeth, thereafter, folded to form. Thereby, the connecting portion and the cover can integrally be formed.

Further, in the bonding step, the flexible board is laminated to the stator core such that the stator core is interposed between the flexible board and the base board. At this occasion, the respective connecting portions of the flexible board are integrally formed with the covers, and therefore, the plurality of covers can efficiently and successively be fitted to the plurality of teeth. That is, it is not necessary to fit the respective covers thereto one by one, and therefore, the covers can be fitted thereto further efficiently and the base board and the covers can be bonded in a short period of time. Therefore, the stator is facilitated to fabricate and the fabrication time period can be shortened.

Further, the board main body of the flexible board is formed with the through hole having the inner diameter substantially the same as that of the ring-like portion of the stator core, and therefore, when the flexible board and the stator core are laminated, the ring-like portion and the board main body are brought into a laminated state. Similarly, also with regard to the ring and the connecting portion, when the flexible board and the stator core are laminated, the ring and the connecting portion are respectively brought into a state of being laminated to the front end portion and the tooth. Therefore, the stator core can be interposed between the flexible board and the base board to be fixed thereby, and the plurality of teeth and the front end portions can integrally and solidly be connected by way of the flexible board and the base board. Therefore, it can further firmly be prevented that the respective teeth are vibrated by being influenced by rotation of the permanent magnet.

Particularly, the flexible board and the cover are integrally formed from one sheet of the insulating base member, and therefore, a positional shift between the connecting portion and the cover is not brought about and the covers can further highly accurately be coated to the teeth. Further, the fabrication time period can further be shortened.

Further, according to the stator of the invention, there is provided the stator of the invention, wherein the teeth are formed by a number of a multiple of 3 and the flexible board is constituted by 3 sheets of boards comprising a first flexible board, a second flexible board and a third flexible board, the first flexible board includes the connecting portions laminated to the teeth by being spaced apart from each other by every 2 thereof in the plurality of teeth, the second flexible board includes the connecting portions laminated to the teeth at positions phases of which are shifted from phases of the teeth laminated to the connecting portion of the first flexible board by one phase in the plurality of teeth, and the third flexible board includes the connecting portions to be laminated to the teeth at positions phases of which are shifted from the teeth laminated to the connecting portions of the second flexible board by one phase in the plurality of teeth.

Further, according to the method of fabricating the stator of the invention, there is provided the method of fabricating the stator of the invention, wherein in the stator core forming step, the teeth are formed by a number of a multiple of 3, in the cover fixing step, as the flexible board, there are prepared 3 sheets of boards comprising a first flexible board having the connecting portions laminated to the teeth by being spaced apart from each other by every 2 thereof in the plurality of teeth, a second flexible board having the connecting portions laminated to the teeth at positions phases of which are shifted from the teeth laminated to the connecting portions of the first flexible board by one thereof in the plurality of teeth, and a third flexible board having the connecting portions laminated to the teeth at positions phases of which are shifted from the teeth laminated to the connecting portions of the second flexible board by one thereof in the plurality of teeth and the covers are fixed to the connecting portions of the respective flexible boards, and in the bonding step, after laminating the flexible boards to the stator core successively from the first flexible board, the cover is bonded to the base board.

According to the stator and the method of fabricating the stator of the invention, in the stator core forming step, the stator core is formed such that the number of the teeth is constituted by the number of the multiple of 3, for example, 18 slots. Successively, in the cover fixing step, as the flexible board, 3 sheets of the flexible boards, that is, the first flexible board, the second flexible board and the third flexible board are prepared. In this case, the intervals of the connecting portions of the first flexible board are adjusted to be laminated to the teeth by being spaced apart from each other by two thereof. Further, the intervals of the connecting portions of the second flexible board are adjusted to be laminated to the teeth at the positions the phases of which are shifted from the teeth laminated with the connecting portions of the first flexible board by 1 slot. Further, the intervals of the connecting portions of the third flexible board are adjusted to be laminated to the teeth at the positions the phases of which are shifted from the teeth laminated with the connecting portions of the second flexible board by 1 slot. Thereby, when 3 sheets of the flexible boards and the stator core are laminated, the connecting portions of the respective flexible boards are not laminated to the connecting portions of other flexible boards.

Further, after fixing the covers to the connecting portions of the respective flexible boards, the covers are fitted to the teeth while laminating the flexible boards to the stator core successively from the first flexible board. Further, finally, the covers are fitted to the base board. At this occasion, as described above, the connecting portions of the respective flexible boards are not laminated to the connecting portions of other flexible boards, and therefore, the covers fixed to the respective connecting portions can firmly be fitted to the teeth.

Particularly, the flexible boards are constituted by 3 sheets thereof, the covers fixed to the connecting portions of the respective flexible boards are alternately fitted to the teeth, and therefore, the permanent magnet can be rotated by supplying the 3 phase alternating currents. That is, the three phase alternating currents can be supplied in a state in which the conductive pattern of the cover fixed to the first flexible board is used exclusive for U phase, the conductive pattern of the cover fixed to the second flexible board is used exclusive for V phase, the conductive pattern of the connecting portion fixed to the third flexible board is used exclusive for W phase.

In this way, the respective flexible boards can be made to constitute the boards respectively exclusively used for U phase, V phase, W phase, and therefore, leading of wirings to respective flexible boards is further facilitated.

Further, according to the method of fabricating the stator of the invention, there is provided the method of fabricating the stator of the invention, in the stator core forming step, the teeth are formed by a number of a multiple of 3, in the press member working step, as the flexible board, there are prepared 3 sheets of boards comprising a first flexible board having the connecting portions laminated to the teeth by being spaced apart from each other by every 2 thereof in the plurality of teeth, a second flexible board having the connecting portions laminated to the teeth at positions phases of which are shifted from the teeth laminated to the connecting portions of the first flexible board by one thereof in the plurality of teeth, and a third flexible board having the connecting portion laminated to the teeth at positions phases of which are shifted from the teeth laminated to the connecting portions of the second flexible board by one thereof and the connecting portions and the covers of the respective flexible boards are integrally formed, and in the bonding step, after laminating the flexible boards to the stator core successively from the first flexible board, the cover is bonded to the base board.

According to the method of fabricating the stator of the invention, in the stator core forming step, the stator core is formed such that the number of the teeth is constituted by the number of the multiple of 3, for example, 18 slots. Successively, in the base member working step, as the flexible board, 3 sheets of the boards, that is, the first flexible board, the second flexible board and the third flexible board are respectively formed. At this occasion, the intervals of the connecting portions of the first flexible board are adjusted to be laminated to the teeth to be spaced apart from each other by two thereof. Further, the intervals of the connecting portions of the second flexible board are adjusted to be laminated to the teeth at the positions the phases of which are shifted from the teeth laminated with the connecting portions of the first flexible board by 1 slot. Further, the intervals of the connecting portions of the third flexible board are adjusted to be laminated to the teeth at the positions the phases of which are shifted from those of the teeth laminated with the connecting portion of the second flexible board by 1 slot. Thereby, when 3 sheets of the flexible boards and the stator core are laminated, the connecting portions of the respective flexible boards are not laminated to the connecting portions of other flexible boards.

Thereby, 3 sheets of the flexible boards integrally formed with the covers at the connecting portions can be provided. Further, in the bonding step, the cover is fitted to the tooth while laminating the flexible boards to the stator core successively from the first flexible board. Further, finally, the cover is bonded to the base board. At this occasion, as described above, the connecting portions of the respective flexible boards are not laminated to the connecting portions of other flexible board, and therefore, the covers constantly formed at the respective connecting portions can firmly be fitted to the teeth.

Particularly, the flexible boards are constituted by 3 sheets thereof, the covers constantly formed at the connecting portions of the respective flexible boards are alternately fitted to the teeth, and therefore, the permanent magnet can be rotated by supplying three phase alternating currents. That is, three phase alternating currents can be supplied in a state in which the conductive pattern of the cover integrally formed to the first flexible board is used exclusive for U phase, the conductive pattern of the cover integrally formed to the second flexible board is used exclusive for V phase, the conductive pattern of the connecting portion integrally formed to the third flexible board is used exclusive for W phase.

In this way, the respective flexible boards can be made to constitute the boards used exclusive for U phase, V phase, W phase, and therefore, leading of wirings to the respective flexible boards or the like is further facilitated.

Further, according to the stator of the invention, there is provided the stator of the invention, wherein the other face of the base board is formed with connection wirings for electrically connecting predetermined coil patterns in the plurality of coil patterns.

Further, according to the method of fabricating the stator of the invention, there is provided the method of fabricating the stator of the invention, wherein in the base board forming step, connection wirings for electrically connecting predetermined coil patterns of the plurality of coil patterns are formed on the other face of the base board.

According to the stator and the method of fabricating the stator of the invention, by the connection wiring formed on other face of the base board (face on a side opposed to one face formed with the coil pattern), predetermined coil patterns of the plurality of coil patterns can electrically be connected. Thereby, the coil patterns can properly be used and an easiness of use can be promoted. For example, the coil patterns can be made to function as U phase, V phase, W phase in order to deal with three phase alternating currents.

Further, according to the stator of the invention, there is provided the stator of the invention, a dummy pattern having a layer thickness substantially the same as a layer thickness of the connection wiring is formed on the other face of the base board over substantially an entire face thereof to fill spaces among the connection wirings.

Further, according to the method of fabricating the stator of the invention, there is provided the method of fabricating the stator of the invention, wherein in the base board forming step, a dummy pattern having a layer thickness substantially the same as a layer thickness of the connection wiring is formed over an entire face of the other face to fill spaces among the connection wiring.

According to the stator and the method of fabricating the stator of the invention, the dummy pattern having the layer thickness substantially the same as that of the connection wiring disposed is formed to fill the spaces among the connection wirings over substantially an entire face of other face of the base board, and therefore, a variation in the thickness of the base board can be eliminated. That is, a stepped difference by the thickness of the connection wiring can be eliminated. Further, the dummy pattern is formed to fill the spaces among the connection wirings, and therefore when the base board is mounted, the connection wiring or the dummy pattern is necessarily present on the back side of the range of laminating the coil pattern and the conductive pattern of the cover.

Therefore, even when jointing is carried out by a simple method of pressing the cover to the base board, a press force can firmly be transmitted to the cover, and the cover can be pressed uniformly. As a result, the conductive pattern and the coil pattern can firmly be bonded and high quality formation can be achieved by further promoting high reliability of the bonding.

Further, a motor according to the invention comprises a stator according to any one of the invention, and a shaft member rotatably supported around the axis line in a state of holding the permanent magnet.

According to the motor of the invention, the thinned stator is provided, and therefore, thinned formation of the motor per se can be achieved. Further, the stator is also the stator excellent in efficiency of the electromotive force and heat radiating performance and formed by high function, and therefore, power consumption can be restrained and high quality formation can be achieved. Further, since the stator promoting durability is provided, durability of the motor per se can be promoted.

Further, a record medium drive apparatus according to the invention comprises the motor of the invention, a holding portion provided at a shaft member for holding a record medium capable of recording various information, and a bearing for rotatably supporting the shaft member around the axis line.

According to the record medium drive apparatus of the invention, the thinned motor is provided, and therefore, thinned formation of the apparatus per se can be achieved. Further, the motor is also the motor excellent in the efficiency of the electromotive force and the heat radiating performance and formed by the high function, and therefore, power consumption can be restrained and high quality formation can be achieved. Further, since the motor promoting the durability is provided, the durability of the apparatus per se can be promoted.

According to the stator and the method of fabricating the stator of the invention, the thinned formation and the high function formation can be achieved, the efficiency of the electromotive force and the heat radiating performance can be promoted, further, the durability can be promoted by eliminating unnecessary vibration. Particularly, the coil can be provided easily and in a short period of time without using the coiling machine, and therefore, low cost formation can be achieved by promoting a fabrication efficiency.

Further, according to the motor and the record medium drive apparatus of the invention, the thinned formation can be achieved, the power consumption can be restrained and the quality can be promoted. Further, durability can be promoted.

DETAILED DESCRIPTION OF THE PREFERRED EMBODIMENTS

First Embodiment

An explanation will be, given of a first embodiment of a stator, a motor and a record medium drive apparatus as well as a method of fabricating a stator according to the invention in reference to FIG. 1 through FIG. 13 as follows.

Figure 1:
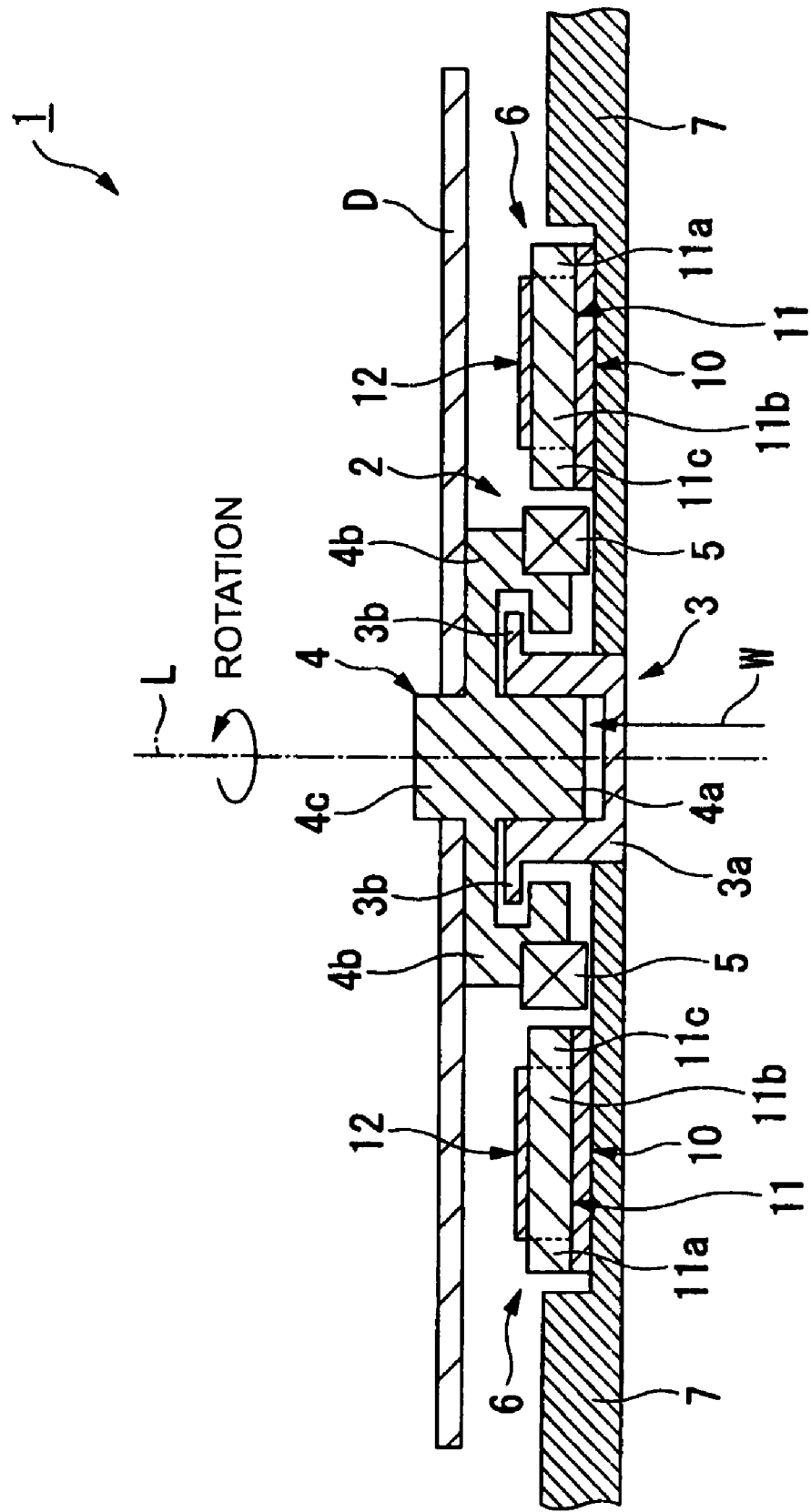
FIG. 1 is a sectional view showing a record medium drive apparatus of a first embodiment according to the invention.

As shown by FIG. 1, a record medium drive apparatus 1 of the embodiment includes a spindle motor (motor) 2 for driving to rotate a hard disk (record medium) D capable of recording various information around an axis line L, a fitting portion (holding portion) 4c provided at a hub (shaft member) 4 of the spindle motor 2 for fitting to hold the hard disk D, and a hydraulic dynamic bearing (bearing) 3 for rotatably supporting the hub 4 around the axis line L.

The spindle motor 2 is a motor of an inner rotor type and includes the hub 4 rotatably supported around the axis line L, a permanent magnet 5 in a ring-like shape held by the hub 4, and a stator 6 opposedly arranged to surround a surrounding of the permanent magnet 5.

The hub 4 includes a shaft portion 4a formed substantially in a circular column shape centering on the axis line L, and a flange 4b formed to extend outward in a radius direction from an outer peripheral face of the shaft portion 4a and formed to interpose a flange 3b of a sleeve 3a mentioned later from upper and lower sides. Further, an upper end of the hub 4 is inserted into a center hole of the hard disk D to constitute the fitting portion 4c for fitting and holding the hard disk D. Further, the permanent magnet 5 is formed such that a sectional area along the radius direction becomes rectangular, and the outer peripheral face thereof becomes a face in a parallel with the axis line L. The permanent magnet 5 is held by the flange 4b.

The hydraulic dynamic bearing 3 is formed by a cup-like shape and includes a sleeve 3a a base end side of which is fixed by a base 7, and oil W supplied to between the sleeve 3a and the hub 4. The sleeve 3a constitutes a containing portion an inner side of which is formed by a circular shape in a section thereof and which contains the shaft portion 4a. Further, an upper end of the sleeve 3a is formed with the flange 3b formed to extend to an outer side in a radius direction. Further, it is designed to form a small gap between the sleeve 3a and the hub 4 and the oil W is supplied to the gap. Further, the oil W is prevented from leaking to a side of the permanent magnet 5 by a seal, not illustrated.

Further, upper and lower outer surfaces of the flange 3b opposed to the flange 4b are formed with pluralities of thrust dynamic pressure generating grooves, not illustrated, referred to as herringbone grooves. Further, also an outer surface of the shaft portion 4a opposed to an outer peripheral face of the sleeve 3a is similarly formed with a plurality of radial dynamic pressure generating grooves referred to as herringbone grooves, not illustrated. Thereby, when the hub 4 is rotated, the oil W flows along the thrust dynamic pressure generating groove and the radial dynamic pressure generating groove to increase, a pressure to thereby stably rotate the hub 4.

That is, the thrust dynamic pressure generating groove and the radial dynamic pressure generating groove are portions constituting the hydraulic dynamic bearing 3.

Figure 2:
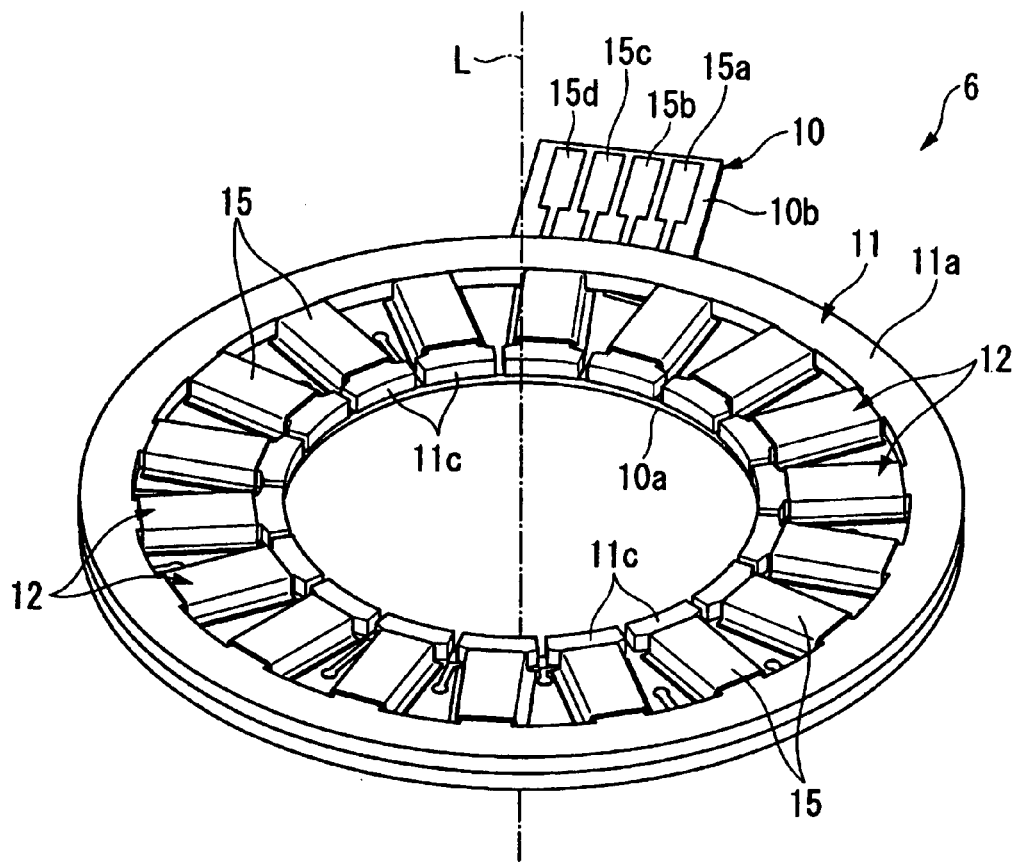
FIG. 2 is a perspective view of a stator constituting the record medium drive apparatus shown in FIG. 1.
Figure 3:
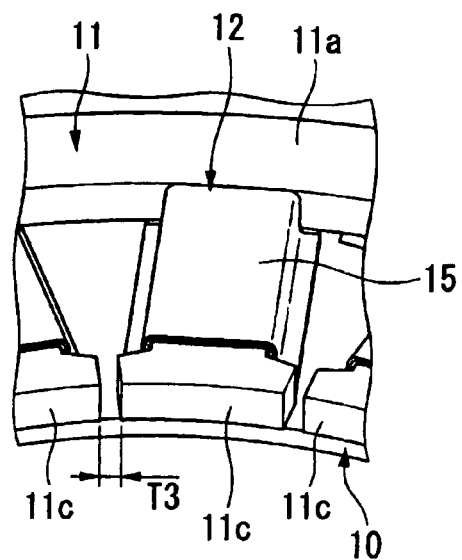
FIG. 3 is a perspective view enlarging a portion of the stator shown in FIG. 2.
Figure 4:
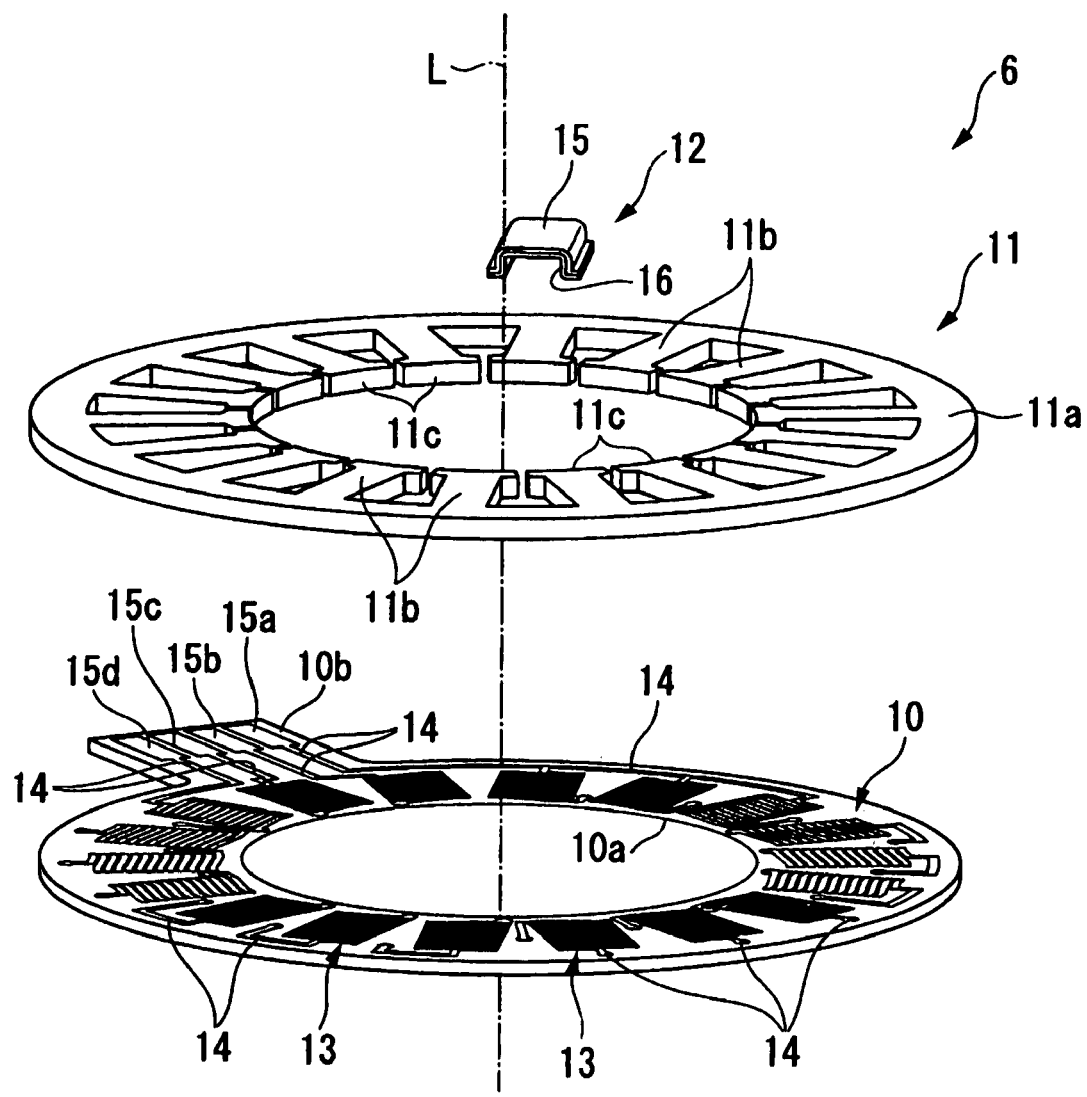
FIG. 4 is a disassembled perspective view of the stator shown in FIG. 2.

As shown by FIG. 2 through FIG. 4, the stator 6 is constituted by combining a base board 10, a stator core 11, and a cover 12, and is fixed in a state of being mounted on the base 7 as shown by FIG. 1.

Figure 5:
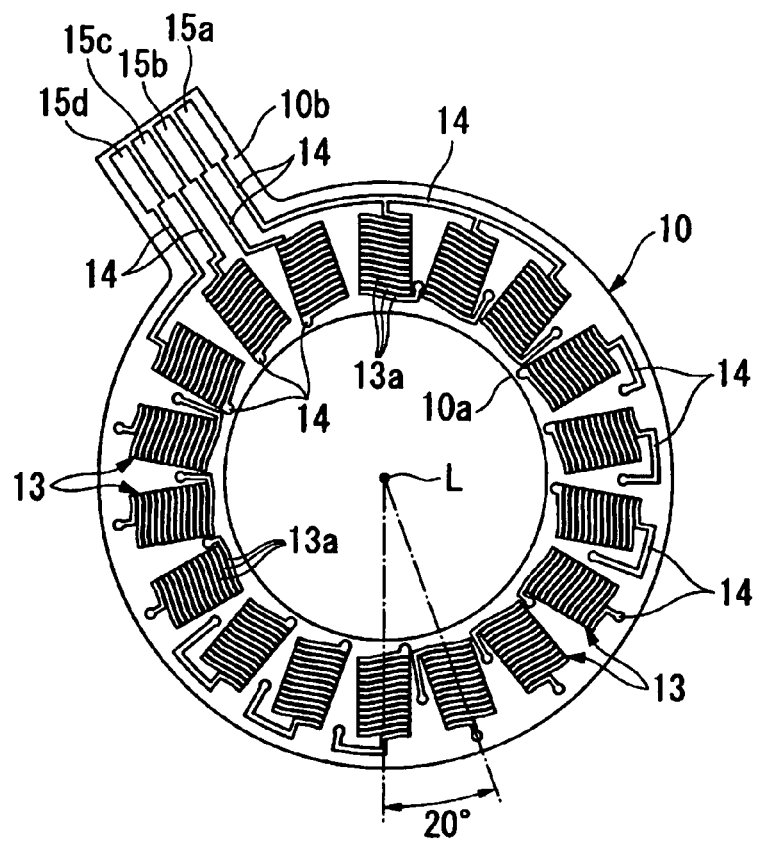
FIG. 5 is a top view of a base board constituting the stator shown in FIG. 4.

The base board 10 is an insulating printed board and is formed with a through hole 10a inserted with the permanent magnet 5 at a center thereof as shown by FIG. 5. Further, the base board 10 of the embodiment is provided with a projected portion 10b formed with outside connection terminals 15a, 15b, 15c, 15d, mentioned later, in a state of being projected to outside from a portion of an outer periphery. Further, coil patterns 13 are formed on a surface (one face) of the base board 10 in a peripheral direction surrounding the through hole 10a at respective predetermined angles centering on the axis line L. According to the embodiment, an example is taken by a case of forming 18 pieces of the coil patterns 13 at respective 20 degrees around the axis line L.

Figure 6:
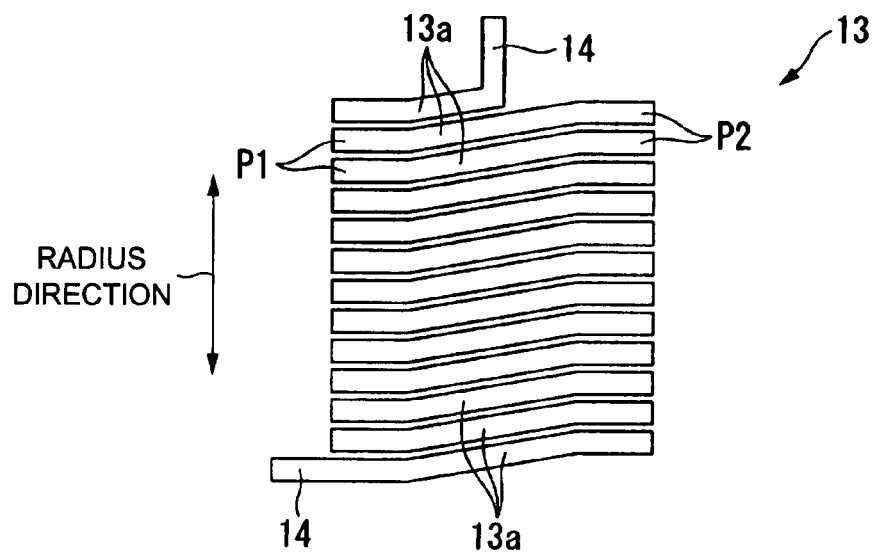
FIG. 6 is a view enlarging a coil pattern shown in FIG. 5.

As shown by FIG. 6, the coil pattern 13 is patterned by a conductive material of copper or the like such that single pieces of wirings 13a electrically independent from each other are aligned at constant intervals in the radius direction in a state of being skewed to the radius direction directed to the permanent magnet 5. That is, the respective wirings 13a are patterned to shift a pitch by one stage at both ends.

Figure 7:
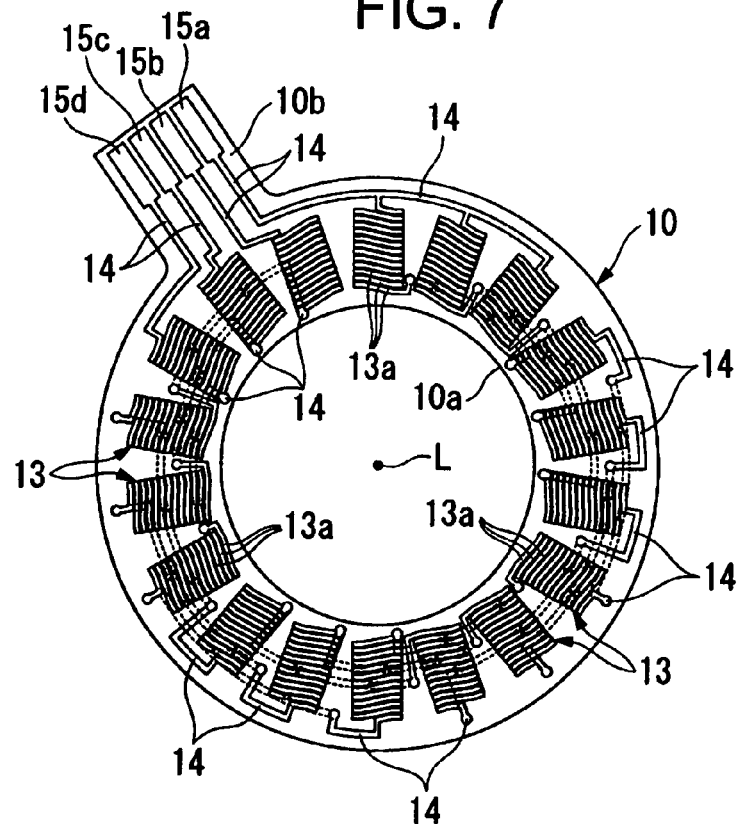
FIG. 7 is a top view of a baseboard constituting the stator shown in FIG. 4 and is a view showing a stator perspectively viewing a connection wiring.
Figure 8:
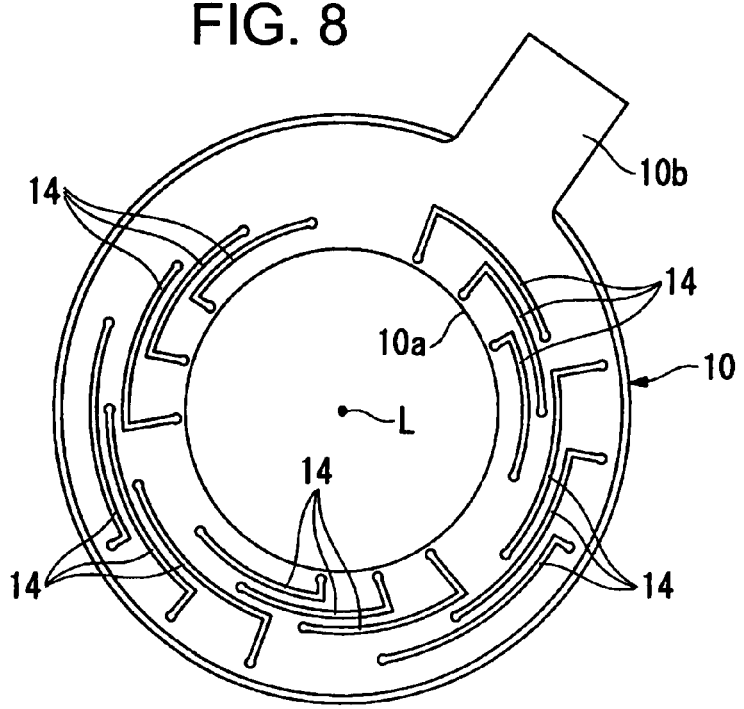
FIG. 8 is a bottom view of the base board constituting the stator shown in FIG. 4.

Further, according to the respective coil patterns 13, portions of the wirings 13a are electrically connected to connection wirings 14 and the respective coil patterns 13 are connected to each other at every 2 thereof by the connection wirings 14. Specifically speaking, as shown by FIG. 5, FIG. 7 and FIG. 8, the connection wirings 14 for connecting every 2 of the coil pattern 13 are pertinently patterned on a surface and a rear face (other face) of the base board 10. Further, the connection wirings 14 are electrically connected between the surface side and the rear face side of the base board 10 by way of a through hole (an inner face of which is plated with a conductive material), not illustrated, penetrating the base board 10. Further, the connection wirings 14 are connected to 4 of the outside connection terminals 15a, 15b, 15c, 15d formed at a projected portion 10b of the base board 10. Further, among 4 of the outside connection terminals 15a, 15b, 15c, 15d, the one outside connection terminal 15a is a common ground terminal and remaining three of the outside connection terminals 15b, 15c, 15d are connected to a three phase alternating current power source as connection terminals for U phase, V phase, W phase.

As shown by FIG. 1, the base board 10 constituted in this way is fixed in a state of being mounted to the base 7. Further, the connection wiring 14 patterned to the rear face of the base board 10 is coated by an insulating layer, not illustrated. Thereby, the connection wiring 14 and the base 7 are not conducted to each other.

The stator core 11 is formed by punching a flat plate of a magnetic member of a silicon steel plate or the like by a press or the like and as shown, by FIG. 4, the stator core 11 includes a core back (ring-like portion) 11a formed in a ring-like shape centering on the axis line L, teeth 11b base ends of which are fixed to the core back 11a and which are formed to extend in a radius direction directed to the permanent magnet 5, and formed by 18 pieces thereof constituting a number the same as the number of the coil patterns 13 at respective predetermined angles (20 degrees) (that is, the slot number is 18 slots) and front end portions 11c respectively formed at front ends of the plurality of teeth 11b and opposed to an outer peripheral face (peripheral face) of the permanent magnet 5.

Further, when the stator core 11 is formed, the stator core 11 may be formed by laminating punched magnetic members (for example, 2 layers). Further, an outer surface of the stator core 11 is coated with an insulating layer, not illustrated, (coated layer).

Figure 9:
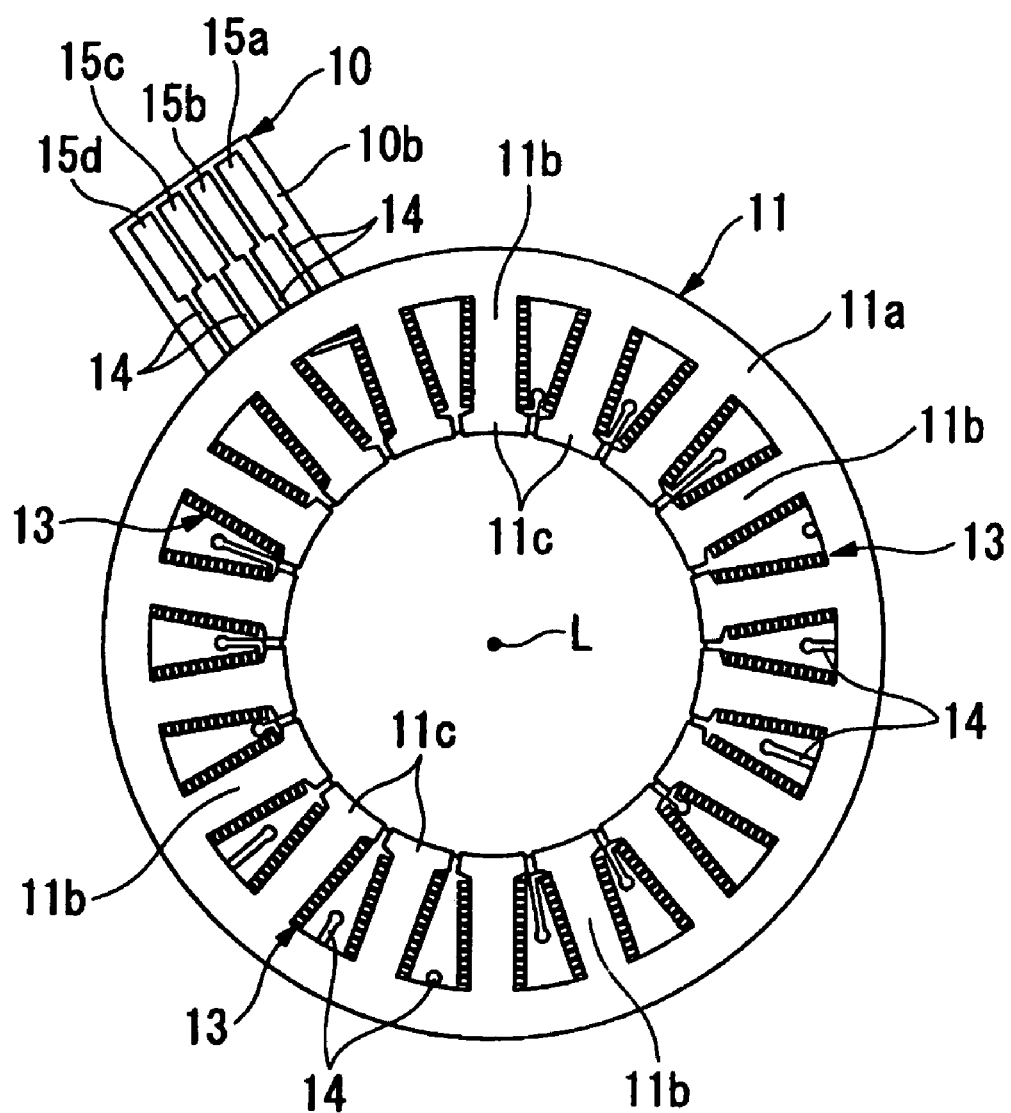
FIG. 9 is a view showing a state of laminating a stator core on the base board shown in FIG. 5.

As shown by FIG. 9, the stator core 11 constituted in this way is laminated onto the base board 10 in a state in which the teeth 11b are opposed to the coil patterns 13 patterned onto the base board 10. In this case, the stator core 11 is laminated in a state of bringing all of the core back 11a, the teeth 11b and the front end portions 11c into press contact with the base board 10.

Figure 10:
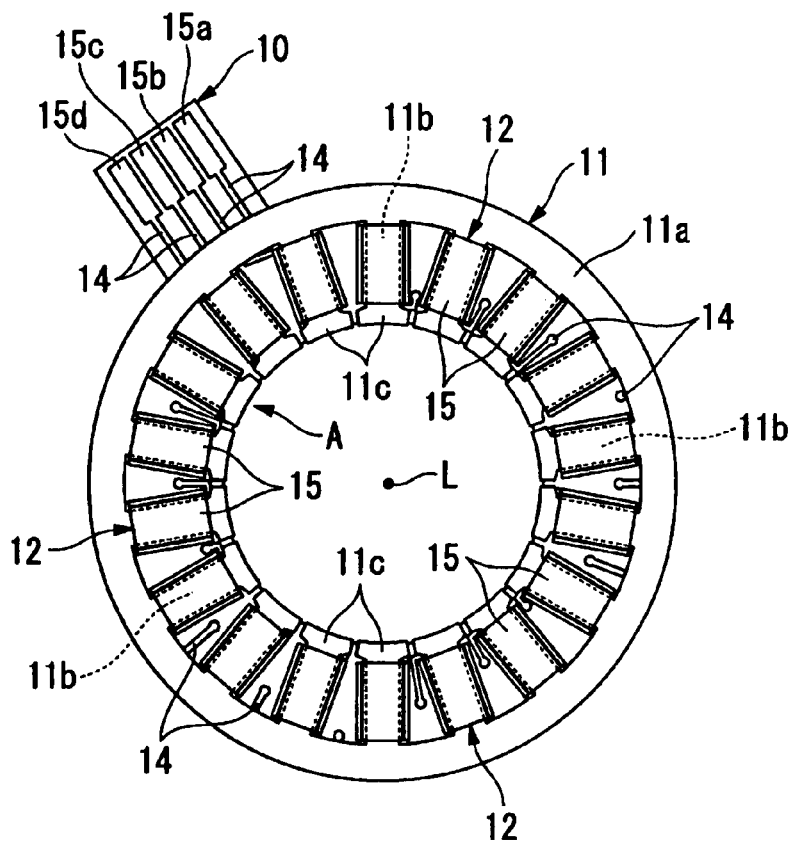
FIG. 10 is a view showing a state of fitting covers to respective teeth of the stator core from the state shown in FIG. 9.
Figure 11:
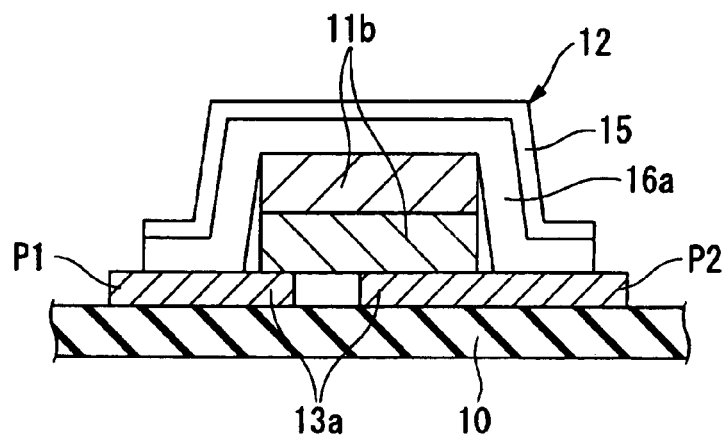
FIG. 11 is a view showing a state of viewing from an arrow mark A direction shown in FIG. 10.

As shown by FIG. 10 and FIG. 11, the covers 12 are constituted by base members 15 fitted to the base board 10 in a state of being respectively fitted to the teeth 11b laminated onto the base board 10 and covering surroundings of the teeth 11b, and conductive patterns 16 patterned to inner faces of the base members 15 and electrically connected to the coil patterns 13.

Figure 12:
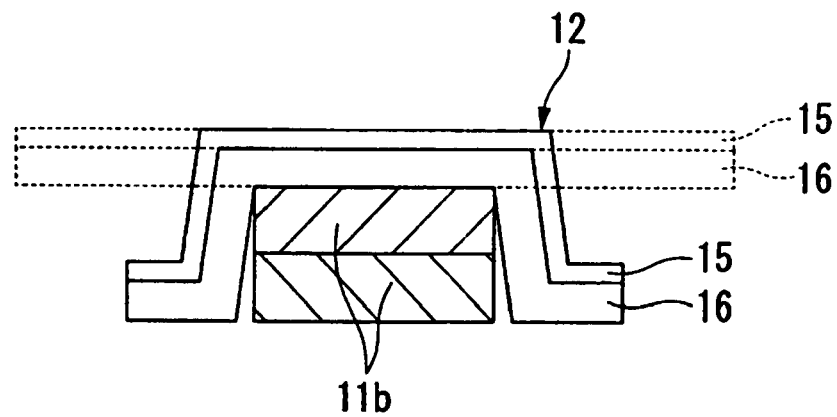
FIG. 12 is a view showing a state of folding to form a cover along a sectional shape of a tooth.

The base member 15 is an insulating sheet of polyimide or the like and is pressed by die or the like in consideration of a sectional shape (width, thickness) of the teeth 11b as shown by FIG. 12. Thereby, the base member 15 can be fitted to the tooth 11b to cover to fit together.

Figure 13:
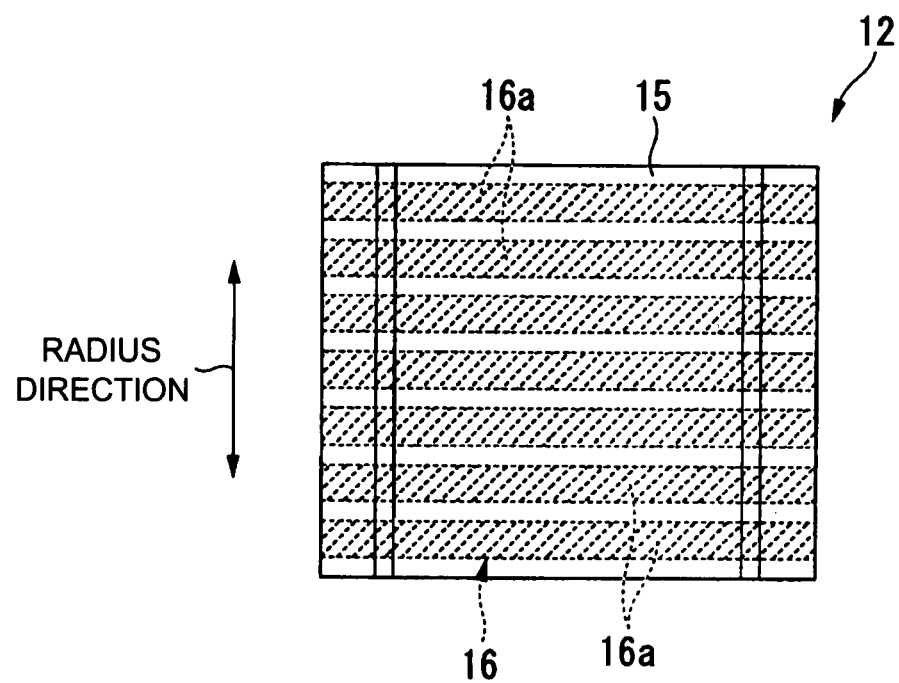
FIG. 13 is a top view of the cover shown in FIG. 12.

Further, as shown by FIG. 13, the conductive pattern 16 is patterned by a conductive material of copper or the like at an inner face of the base member 15 such that single pieces of the wirings 16a independent from each other electrically are aligned at constant intervals in the radius direction directed to the permanent magnet 5. Further, at this occasion, the respective wirings 16a are patterned to be orthogonal to the radius direction.

Thereby, the respective wirings 16a of the conductive pattern 16 are brought into a state in which when the cover 12 is fitted to the tooth 11b, respective both ends thereof are brought into contact with one end P1 and other ends P2 of the wirings 13a contiguous to each other in the wirings 13a of the coil pattern 13 as shown by FIG. 6.

Therefore, the coil pattern 13 and the conductive pattern 16 function as a coil of exciting the tooth 11b by spirally winding the surrounding of the tooth 11b by being connected to each other electrically.

Next, a method of fabricating the stator 6 will be explained as follows.

The fabricating method according to the embodiment is a fabricating method by pertinently carrying out a base board working step, a stator core forming step, a layer coating step, a base member working step, a fixing step, and a bonding step.

First, as shown in FIG. 5 through FIG. 9, there is carried out a base board working step of forming the through hole 10a at the base board 10 and patterning 18 pieces of the coil patterns 13 at respective 20 degrees centering on the axis line L in a peripheral direction surrounding the through hole 10a. Further, at this occasion, 4 of the outside connection terminals 15a, 15b, 15c, 15d are formed on the projected portion 10b of the base board 10, and the connection windings 14 are patterned on the surface and the rear face of the base board 10. Specifically, layers of a conductive material are formed on the two faces of the base board 10 formed with the through hole, thereafter, by utilizing a photolithography technology, the outside connection terminals 15a, 15b, 15c, 15d, the coil patterns 13 and the connection windings 14 are patterned in one motion.

As a result, the base board 10 shown in FIG. 4 can be provided. Further, an insulating layer is coated on the connection wiring 14 patterned on the rear face of the base board 10.

Further, there is carried out the stator core forming step of forming the stator core 11 at a timing the same as that of the above-described base board working step, or a timing therebefore or thereafter. That is, the stator core 11 comprising the core back 11a and the teeth 11b and the front end portions 11c is formed by punching a flat plate of a magnetic member by a press or the like. At this occasion, the teeth 11b are formed by a number the same as that of the coil patterns 13, that is, 18 pieces by angles the same as angles of forming the coil patterns 13. Thereby, the stator core 11 shown in FIG. 4 can be provided. Further, there is carried out a layer coating step of coating an insulating layer on an outer surface of the stator 11 by a shape of a thin layer.

Further, there is carried but the base member working step of forming the cover 12 by a timing the same as those of the respective steps, or a timing therebefore or thereafter. That is, the conductive pattern 16 is formed by patterning a conductive material on the base member 15 of polyimide or the like, thereafter, as shown by FIG. 12, the base member 15 is folded to form by utilizing a die in a state of making the conductive pattern 16 disposed on an inner side to thereby form the cover 12. In this case, the cover 12 is formed in consideration of the sectional shape (width, thickness) of the tooth 11b such that the cover 12 can be fitted to the tooth 11b to cover to fit together. Further, the covers 12 are formed by 18 pieces constituting the number of the teeth 11b. After finishing the above-described respective steps, first, there is carried out the fixing step of fixing the base board 10 and the stator core 11. That is, the base board 10 and the stator core 11 are laminated together such that the coil patterns 13 and the teeth 11b are respectively opposed to each other, thereafter, the both members are fixed by adhering or the like. As shown by FIG. 9, there is brought about a state in which the respective teeth 11b are mounted on the coil pattern 13. Further, the stator core 11 is brought into a state of being laminated together with the base board 10 in a state of bringing all of the core back 11a, the teeth 11b and the front end portions 11c into face contact with the base board 10. After finishing the fixing step, as shown by FIG. 10, the covers 12 are respectively fitted to the teeth 11b laminated on the base board 1Q, that is, fitted to cover the teeth 11b. At this occasion, as shown by FIG. 11, the conductive pattern 16 pattered on an inner face of the cover 12 is brought into a state of being brought into contact with the tooth 11b. Further, the both ends of the respective wirings 16a of the conductive patterns 16 are respectively brought into contact with the one ends P1 and the other ends P2 of the wirings 13a contiguous to each other in the wirings 13a of the coil pattern 13.

Further, the conductive pattern 16 and the coil pattern 13 are electrically connected by bonding the cover 12 to the baseboard 10 by soldering, thermal pressure bonding, ultrasonic bonding, welding or the like. By the electric connection, the surrounding of the tooth 11b can spirally be wound by the coil pattern 13 and the conductive pattern 16 to be able to function as the coil for exciting the tooth 11b.

The stator 6 shown in FIG. 2 and FIG. 3 can be fabricated by the above-described.

Next, an operation of the record medium drive apparatus 1 constituted in this way will be explained as follows.

First, the outside connection terminal 15a constituting the common ground terminal is connected to the ground and the remaining three of the outside connection terminals 15b, 15c, 15d are connected to the three phase alternating current power source, thereafter, the three phase alternating currents are supplied to the respective coil patterns 13 and the respective conductive patterns 16 by way of the communication windings 14. Then, since the coil patterns 13 and the conductive patterns 16 function as the coils (U phase, V phase, W phase) spirally winding the teeth 11b, the teeth 11b are excited and a magnetic field is generated. By the magnetic field, the hard disk D can be rotated by rotating the permanent magnet 5 and the hub 4 around the axis line L.

Further, in this case, the stator core 11 includes the front end portions 11c opposed to the outer peripheral face of the permanent magnet 5 at the front ends of the teeth 11b, and therefore, delivery of a magnetic flux between the stator core 11 and the permanent magnet 5 become dense. Therefore, the hub 4 can efficiently be rotated. Further, in accordance with rotation of the hub 4, the oil W flows along the thrust dynamic pressure generating groove and the radial dynamic pressure generating groove, and therefore, a pressure is increased. Thereby, the hub 4 is supported by forces in the thrust direction and the radial direction by the hydraulic dynamic bearing 3, and therefore, the hub 4 is smoothly rotated.

Particularly, the coil pattern 13 patterned to the base board 10 and the conductive pattern 16 patterned to the inner face of the cover 12 can be made to function as the coil, and therefore, different from the constitution of forming the coil by mechanically winding the coil wire as in the related art, the coiling machine needs not to be used. Therefore, the number of the teeth 11b, that is, the slot number can be increased to 18 pieces. Therefore, the turn number of the coil per single tooth 11b can be reduced, and the thickness can be restrained as less as possible. Therefore, the thinned formation of the total can be achieved.

Further, the coil patterns 13 and the conductive patterns 16 are brought into the state of being brought into contact with the teeth 11b by way of the insulating layer. Therefore, a wasteful gap is not formed between the coil pattern 13 and the conductive pattern 16 and the tooth 11b. Therefore, after ensuring insulation between the coil pattern 13 and the conductive pattern 16 and the tooth 11b, lengths of the coil pattern 13 and the conductive pattern 16 can be constituted by necessary minimum lengths and an electric resistance can be restrained as less as possible. Therefore, the electromotive force can efficiently be generated without reducing reliability and wasteful power consumption can be eliminated.

Further, the stator core 11 other than the teeth 11b is exposed, and therefore, an exposure area exposed to the atmosphere is larger than that of the related art. Therefore, heat generated by electricity conduction can efficiently be radiated. Therefore, an operational area, exfoliation of a part by heat or the like can be restrained from being brought about and the reliability can be promoted.

Further, it is not necessary to utilize the coiling machine, and therefore, as shown by FIG. 3, the gap T3 between the contiguous front end portion 11c can be made to be as small as possible. Therefore, a portion of a magnetic line of force flowing through the tooth 11b can be made to flow to the contiguous tooth 11b by way of the front end portion 11c, and the magnetic force of attracting the permanent magnet 5 and the front end portion 11c to each other can be reduced. As a result, a cogging torque can be reduced and high function formation can be achieved.

Further, the stator core 11 is fixed onto the base board 10 over the core back 11a, the teeth 11b and the front end portions 11c and further pressed to the base board 10 by the covers 12. Therefore, although base end sides of the respective teeth 11b are fixed to the core back 11a in a cantilever state, the respective teeth 11b are brought into a state of being connected to each other by way of the base board 10. Therefore, vibration of the respective teeth 11b caused by an influence of rotation of the permanent magnet 5 can be restrained. When the base end sides of the respective teeth 11b are only fixed to the core back 11a assumedly, there is a concern that unnecessary vibration of fluctuating the respective teeth 11b or the like is brought about by being influenced by rotation of the permanent magnet 5. However, as descried above, the respective teeth 11b are brought into a state of being connected to each other, and therefore, the unnecessary vibration can be restrained as less as possible. Therefore, strange sound can be eliminated and durability can be promoted.

As described above, according to the stator 6 of the embodiment, thinned formation and high performance formation can be achieved, efficiency of the electromotive force and heat radiation performance can be promoted, further, durability can be promoted by eliminating unnecessary vibration. Particularly, the coil can be provided easily and in a short period time without using the coiling machine, and therefore, low cost formation can be achieved by promoting a fabrication efficiency.

Further, according to the spindle motor 2 of the embodiment, since the above-described stator 6 is provided, thinned formation can be achieved. Further, owing to the stator 6 excellent in efficiency of the electromotive force and brought into high function formation, power consumption can be restrained and high quality formation can be achieved. Further, durability of the spindle motor 2 per se can be promoted.

Further, according to the record medium drive apparatus 1 of the embodiment, since the above-descried spindle motor 2 is provided, thinned formation can be achieved and the quality can be promoted by restraining power consumption. Further, durability can be promoted.

Figure 14:
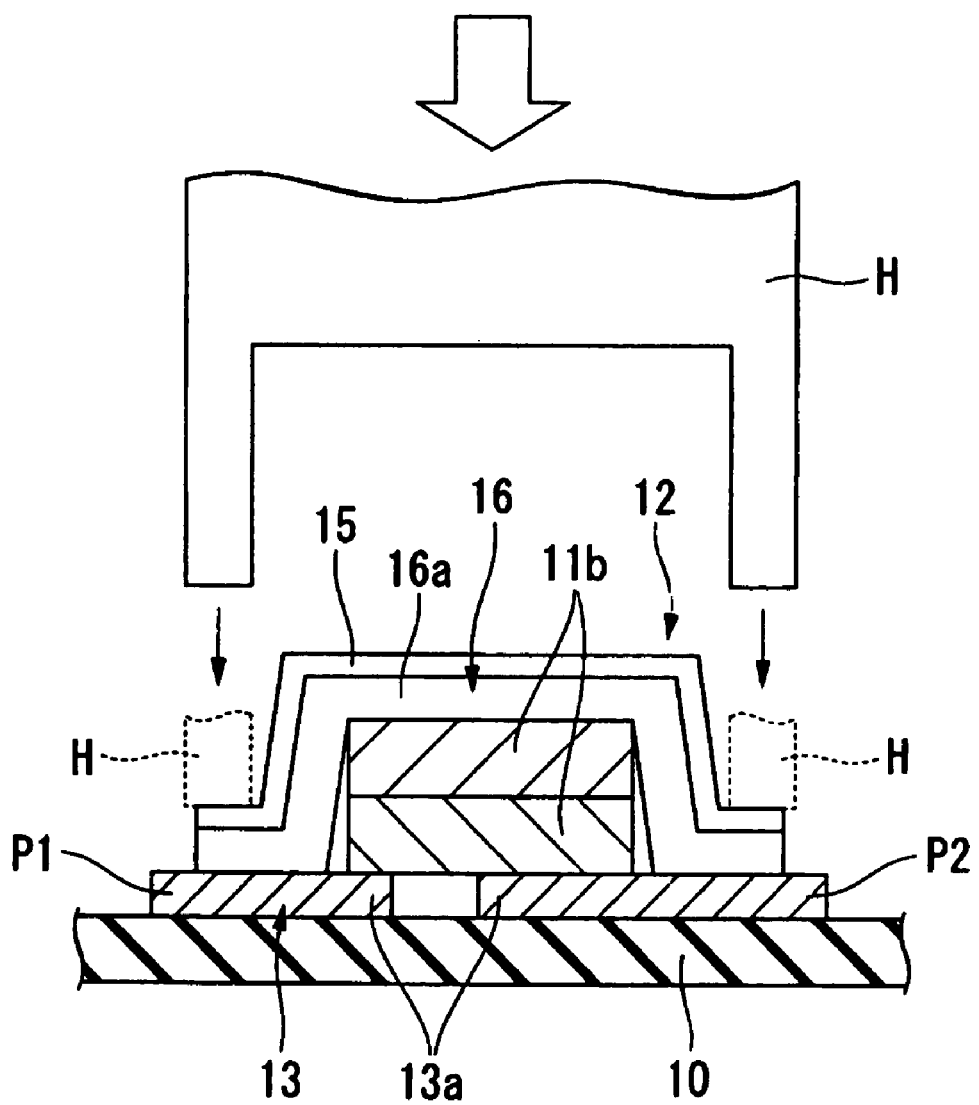
FIG. 14 is a view showing a step of bonding a cover to a base board by utilizing a heater.

Further, although according to the above-described first embodiment, when the cover 12 is bonded, the cover 12 is bonded by soldering, thermal pressure bonding, ultrasonic bonding, welding or the like, when the respective conductive patterns 16 of the cover 12 cannot summarizingly be bonded to the coil patterns 13, it is preferable to utilize a heater H shown in FIG. 14. According to the heater H, a head portion of a front end thereof is bifurcated to be able to be brought into contact with both ends of the cover 12 covered onto the tooth 11b.

When the bonding is carried out by utilizing the heater H, first, the base board 10 fixed with the stator core 11 is mounted onto a horizontal base, not illustrated. Further, after the head reaches a predetermined temperature, the heater H is pressed to the both ends of the cover 12 as shown by FIG. 14. At this occasion, the heater H is pressed by a predetermined pressure. That is, while heating the cover 12, the cover 12 is pressed to the base board 10. As a result, the respective conductive patterns 16 of the covers 12 can simultaneously be bonded to the coil patterns 13 in one motion.

By carrying out the bonding by utilizing the heater H in this way, the conductive pattern 16 and the coil pattern 13 can further firmly be connected and further, a time period consumed for the bonding can be shortened, and therefore, the bonding is further preferable.

Figure 15:
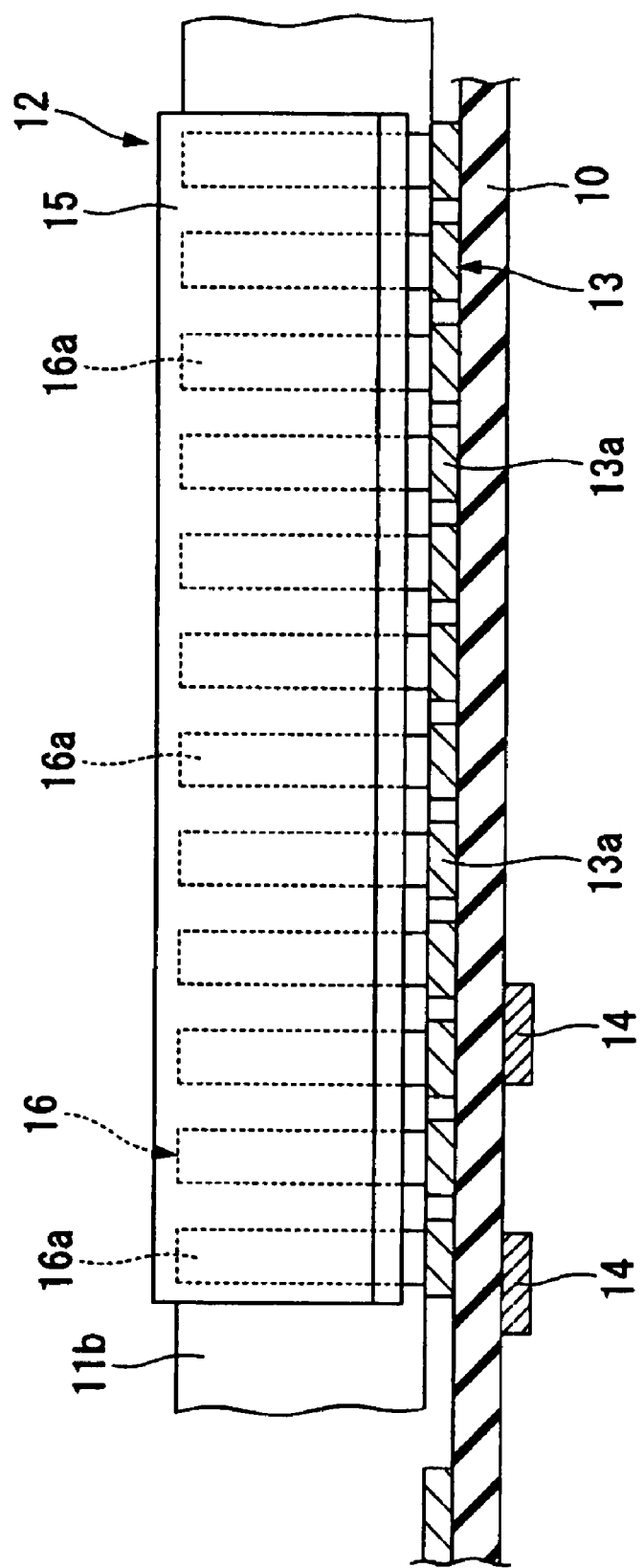
FIG. 15 is a sectional view showing a state of fitting a cover to a tooth of a stator core.

Meanwhile, as shown by FIG. 8, the rear face of the base board 10 is pertinently patterned with the connection wiring 14. Therefore, when the cover 12 is fitted to the tooth 11b, as shown by FIG. 15, there are necessarily brought about portions at which the connection wirings 14 are present and portions at which the connection wirings 14 are not present on a lower side of the cover 12. Therefore, there is a case in which a stepped difference is brought about by the thickness of the connection wiring 14 when the base board 10 is mounted onto the horizontal base.

Therefore, when the heater H is pressed thereto, with regard to the portion at which the connection wiring 14 is formed at a rear face of the base board 10, a press force is firmly transmitted to the horizontal base by way of the connection wiring 14. Therefore, the pressure can firmly be applied to the cover 12 and the bonding can firmly be carried out. On the other hand, with regard to a portion at which the connection wiring 14 is not formed at the rear face of the base board 10, there is brought about a state in which the base board 10 is floated above the horizontal base, and there is a concern that the press force cannot firmly be transmitted and the bonding cannot firmly be carried out.

In this way, there is a case in which owing to the stepped difference brought about by presence/absence of the connection wiring 14, there are brought about a portion in which the press force is transmitted and a portion in which the press force is difficult to be transmitted and the base board 10 cannot uniformly be pressed. Therefore, there is a possibility of bringing about a nonuniformity in the bonding.

Hence, in order to avoid the above-described drawback, it is preferable to carry out a countermeasure as follows.

That is, when the connection wiring 14 is patterned to the rear face of the base board 10, it is preferable that the connection wiring 14 is patterned to be opposed to a range of laminating the conductive pattern 16 and the coil pattern 13 as much as possible by interposing the cover 12. Thereby, when the heater H is pressed, the base board 10 can be pressed as uniform as possible, and therefore, the bonding is further ensured and reliability is promoted.

Further, in this case, it is preferable to form the width of the connection wiring 14 as wide as possible more than the width of the coil pattern 13. Thereby, the connection wiring 14 is easier to be opposed to the range of laminating the conductive pattern 16 of the cover 12 and the coil pattern 13.

Although as described above, it is preferable to devise the patterning of the connection wiring 14, there is a case in which it is difficult to always make the connection wiring 14 opposed to the range of laminating the conductive pattern 16 of the cover 12 and the coil pattern 13. Hence, it is further preferable to form a dummy pattern 19 on the rear face side of the base board 10.

Figure 16:
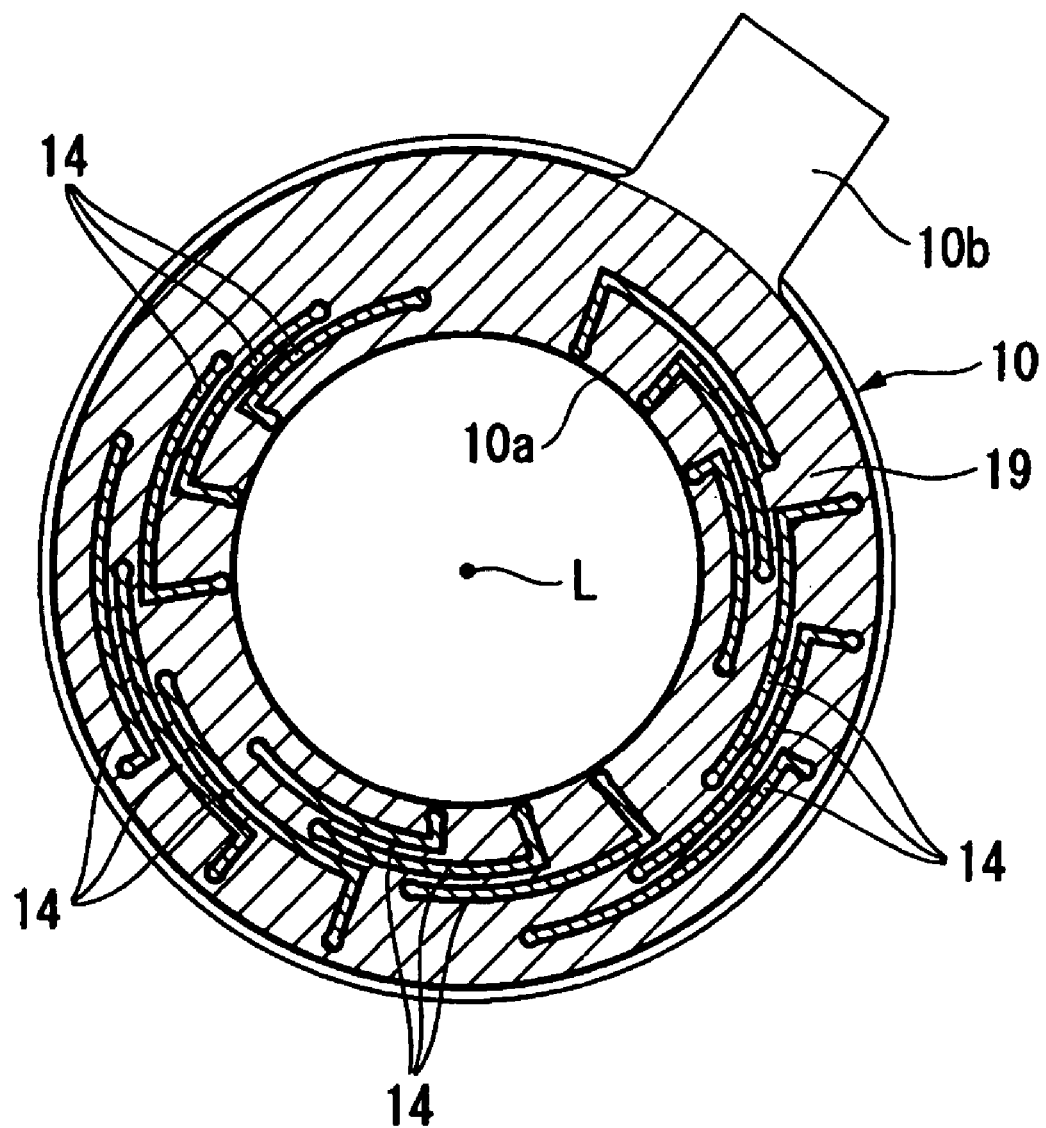
FIG. 16 is a view showing a modified example of a stator according to the invention and is a view viewing a base board formed with a dummy pattern having a layer thickness substantially the same as that of a connection wiring from a rear face.
Figure 17:
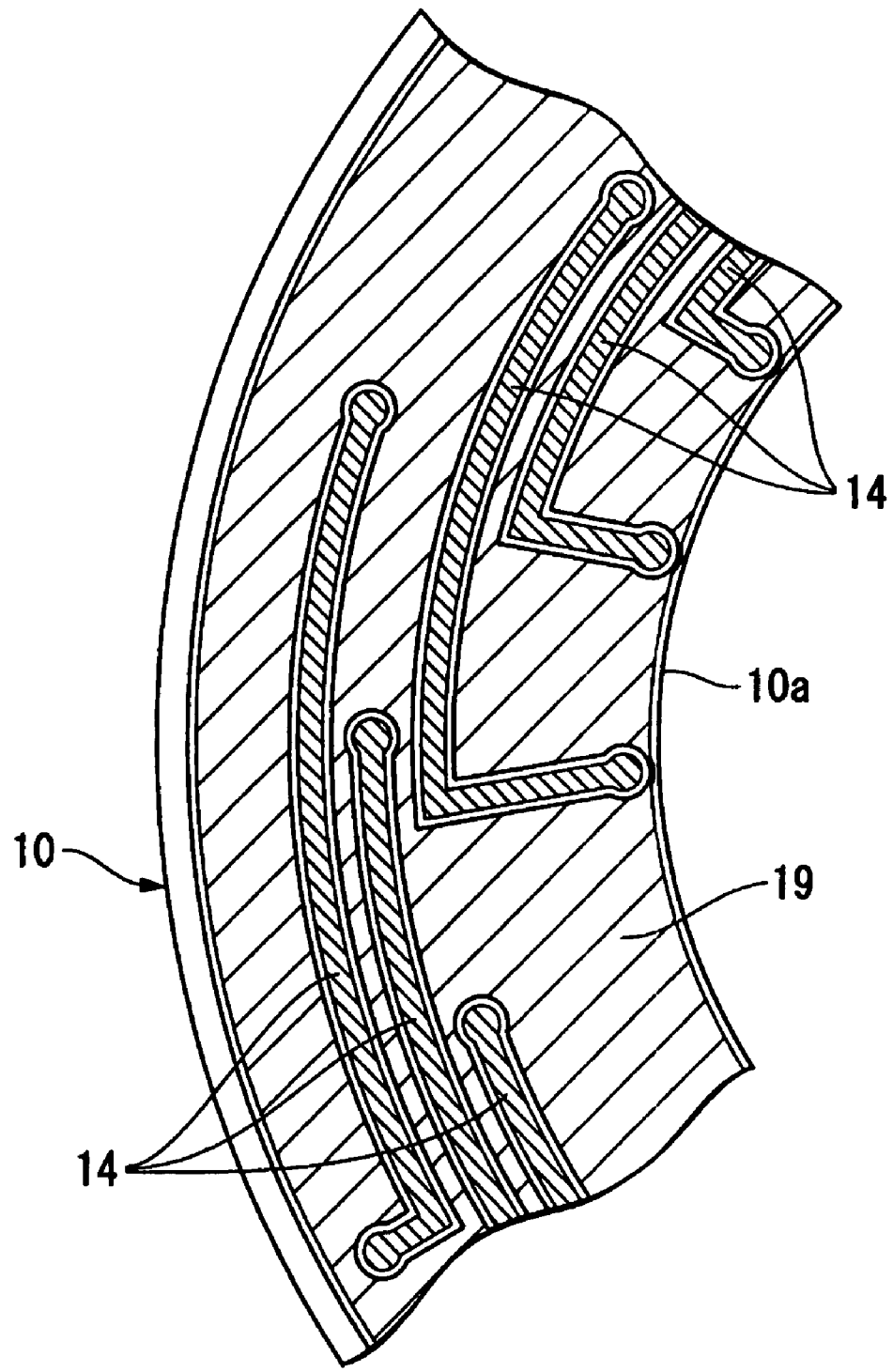
FIG. 17 is a view enlarging a portion of the base board shown in FIG. 16.

The dummy pattern 19 is constituted by, for example, an insulating layer or a conductive layer, and formed over substantially an entire face of the rear face of the base board 10 as shown by FIG. 16. In this case, as shown by FIG. 17, the dummy pattern 19 is formed to fill a vacant space to fill surroundings of the connection wirings 14 in a state of forming a more or less gap between the pattern 19 and the connection wirings 14. Therefore, even when the dummy pattern 19 is formed by a conductive layer, there is not a concern of conducting the connection wiring 14 and the dummy pattern 19. Further, the dummy pattern 19 is formed to constitute a layer thickness substantially the same as that of the connection wiring 14.

Figure 18:
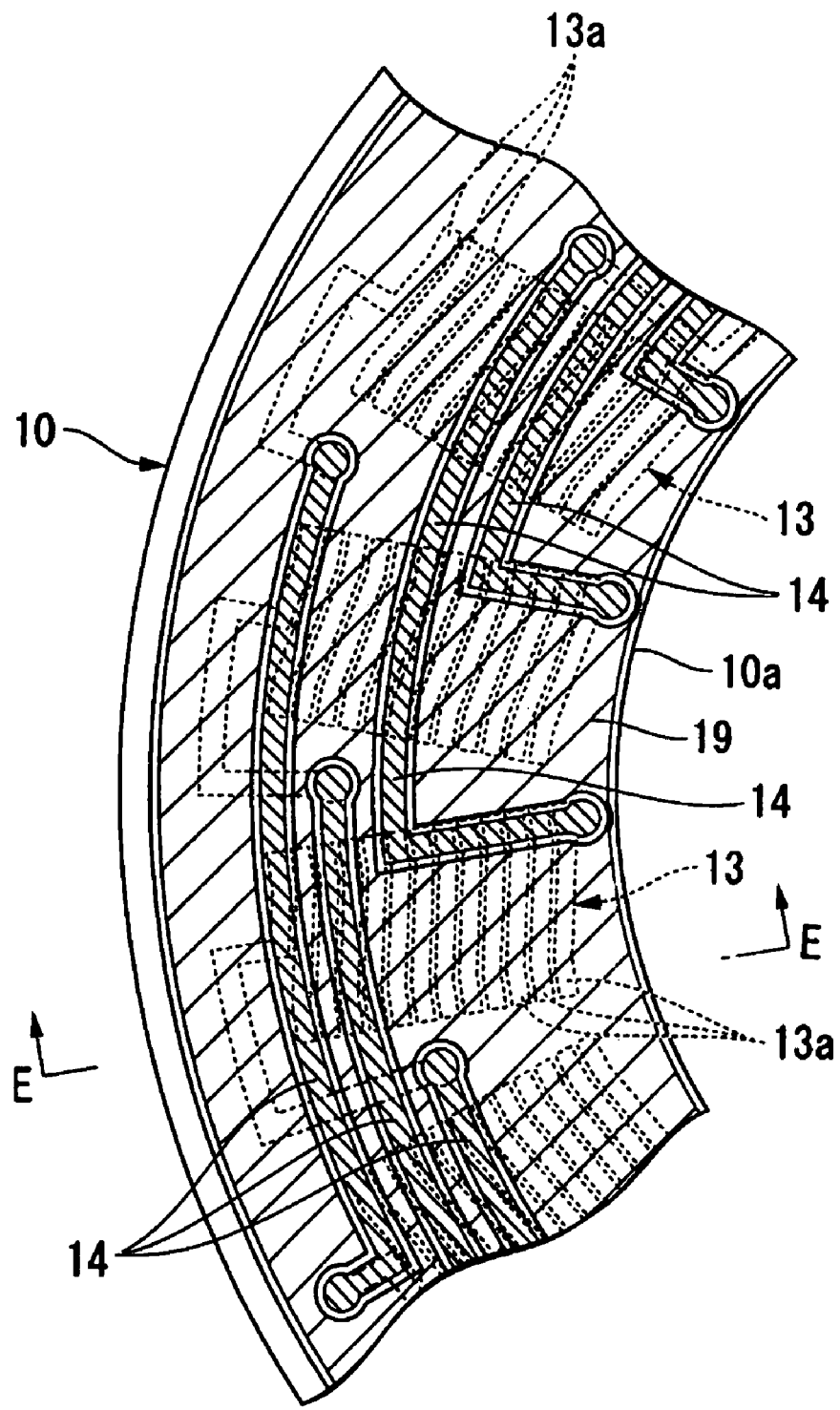
FIG. 18 is a view perspectively viewing a coil pattern in a state shown in FIG. 17.
Figure 19:
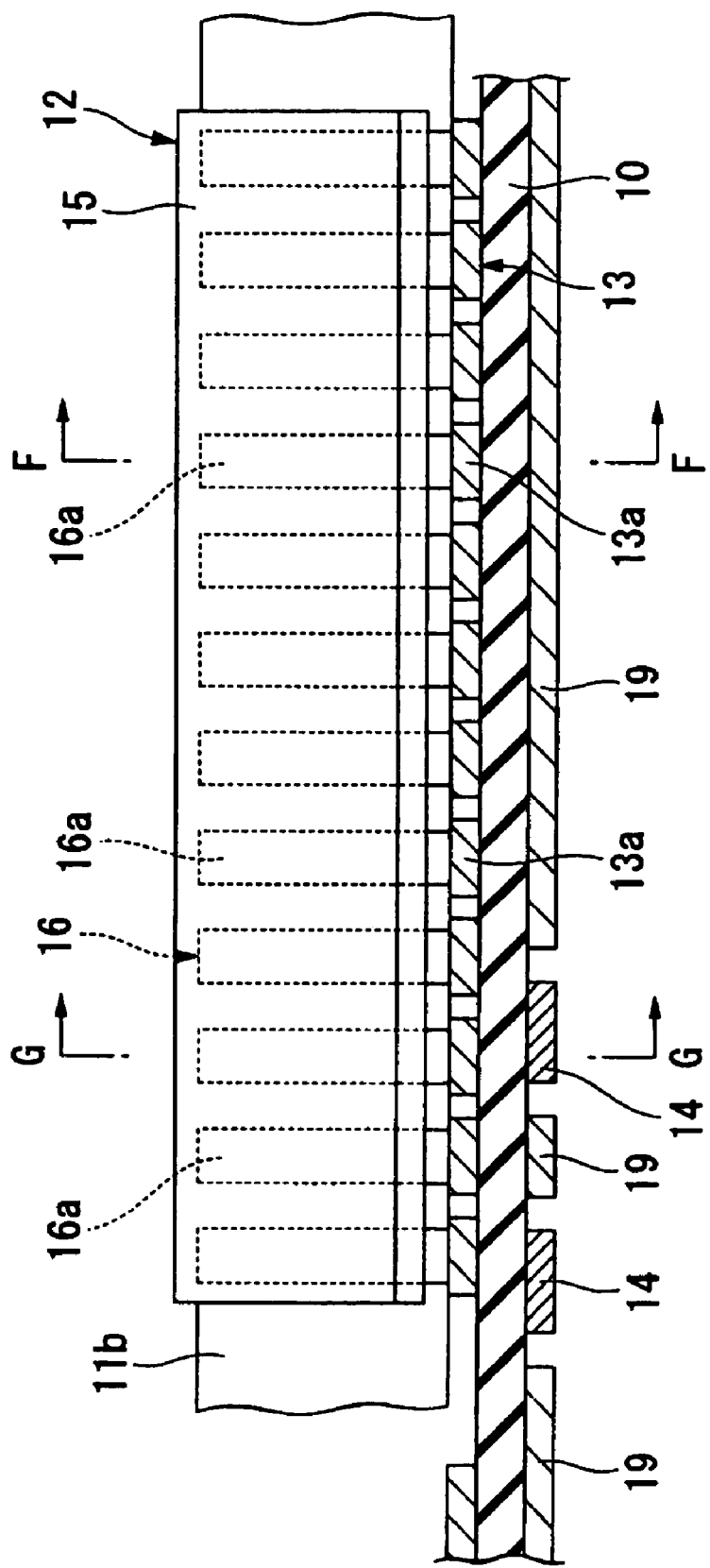
FIG. 19 is a view of a section shown in FIG. 18 taken along a line E-E.
Figure 20:
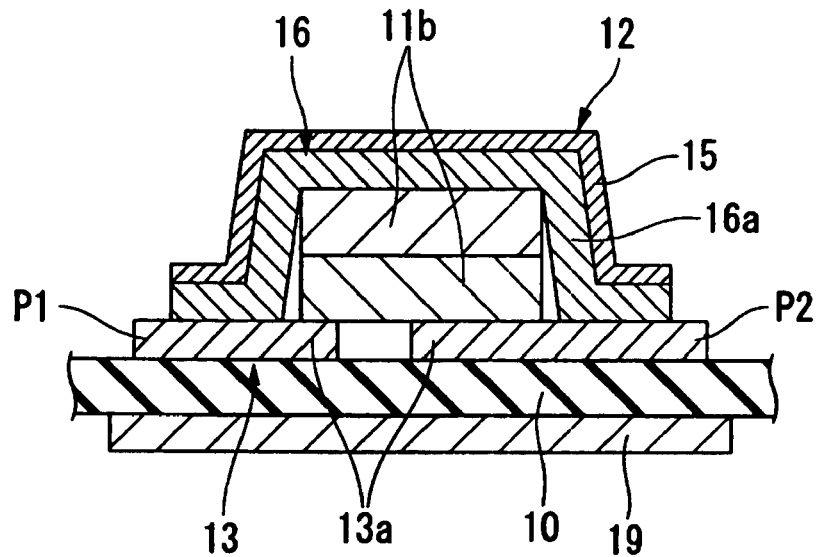
FIG. 20 is a view of a section shown in FIG. 19 taken along a line F-F.
Figure 21:
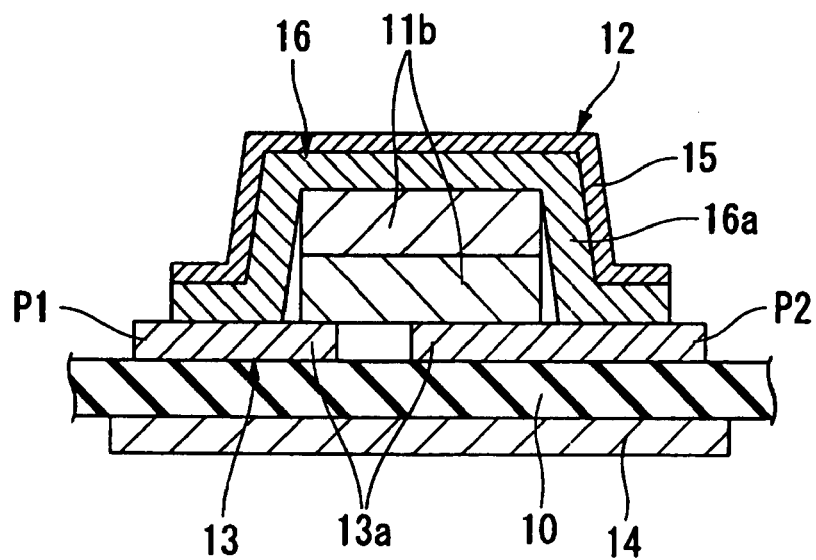
FIG. 21 is a view of a section shown in FIG. 19 taken along a line G-G.

By forming the dummy pattern 19 at the rear face of the base board 10 in this way, as shown by FIG. 18, either of the connection wiring 14 or the dummy pattern 19 can be made to be necessarily present on the rear face side of the range of laminating the coil pattern 13 and the conductive pattern 16 of the cover 12. Further, as shown in FIG. 19 through FIG. 21, both of the connection wiring 14 and the dummy pattern 19 are constituted by substantially the same layer thickness, and therefore, when the base board 10 is mounted onto the horizontal base, there is not a variation in the thickness and a height of an upper face of the base board 10 becomes a uniform height.

Therefore, when the heater H is pressed to the cover 12, the press force is conducted to the horizontal base necessarily by way of the connection wiring 14 or the dummy pattern 19, and therefore, the cover 12 can uniformly be pressed, as a result, the respective conductive patterns 16 of the covers 12 can firmly be bonded to the coil patterns 13 by the same condition, and high quality formation can be achieved by promoting further the reliability of bonding.

Further, when the dummy pattern 19 is formed, it is preferable to use a conductive material of a material the same as that of the connection wiring 14 (for example, copper). As a method of forming the dummy pattern 19 in this case, first, a layer of a conductive material is formed over an entire rear face of the base board 10 to form the conductive layer. Further, the conductive layer is patterned by utilizing the photolithography technology and the connection wiring 14 and the dummy pattern 19 are simultaneously formed. In this way, the connection wiring 14 and the dummy pattern 19 can be formed by one step, and therefore, the operational efficiency can be promoted. Further, the connection wiring 14 and the dummy pattern 19 can easily and firmly be constituted by the same layer thickness.

Second Embodiment

Next, a second embodiment of a stator according to the invention will be explained in reference to FIG. 22 and FIG. 23. Further, in the second embodiment, portions the same as constituent elements of the first embodiment are attached with the same notations and an explanation thereof will be omitted.

A point by which the second embodiment and the first embodiment differ from each other resides in that although according to the first embodiment, 18 pieces of the covers 12 are scattered one by one, according to the second embodiment, 18 pieces of the covers 12 are previously fixed to a flexible board 21 constituted by 3 sheets of flexible boards 22, 23, 24.

Figure 22:
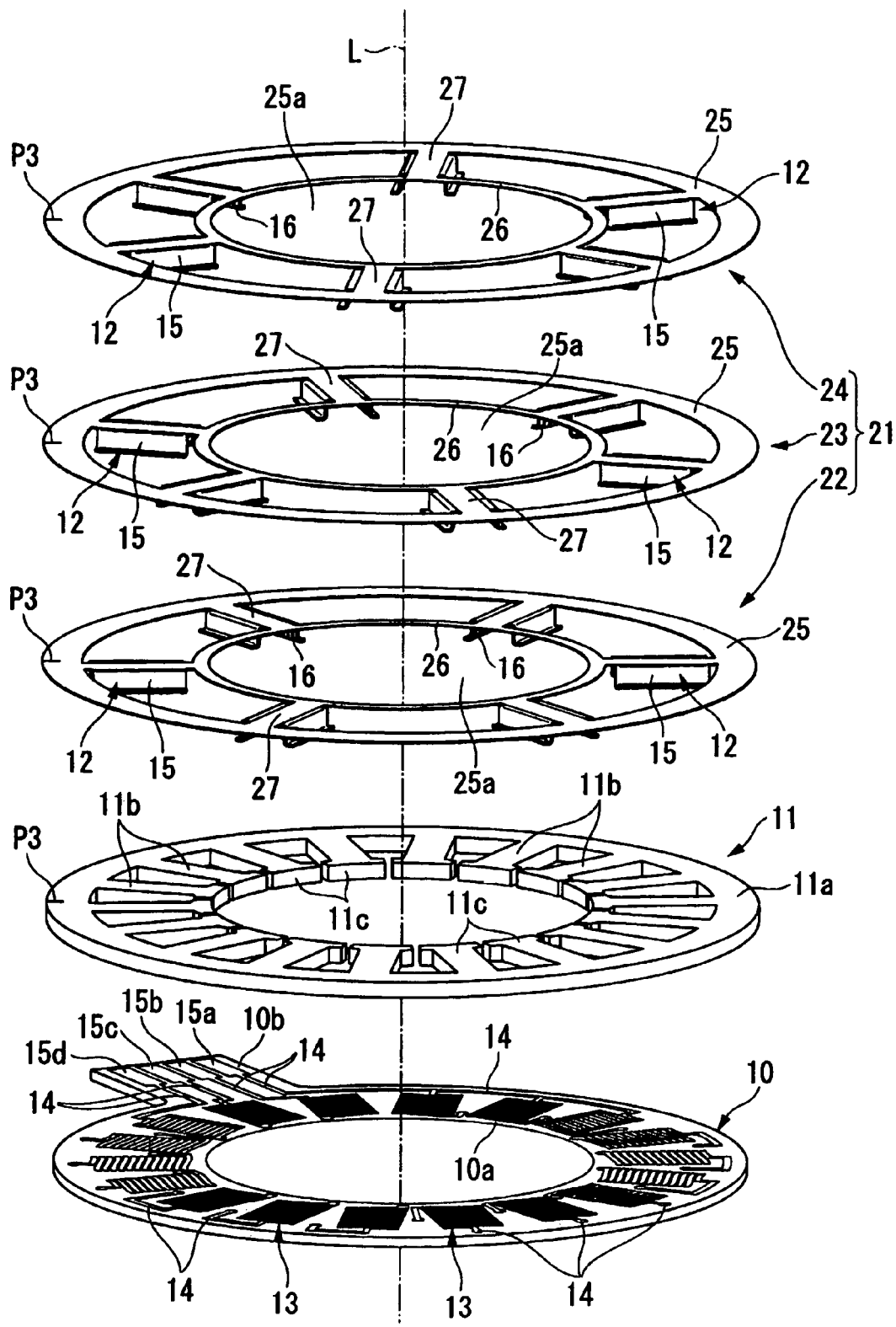
FIG. 22 is a disassembled perspective view of a stator of a second embodiment according to the invention.

That is, as shown by FIG. 22, the stator 20 of the embodiment is constituted by the base board 10, the stator core 11, and the flexible board 21 fixed with the covers 12.

As descried above, the flexible board 21 is constituted by 3 sheets of the boards, that is, the first flexible board 22, the second flexible board 23 and the third flexible board 24, respectives thereof are arranged to be able to be laminated to the stator core 11. In this case, according to the embodiment, an explanation will be given such that lamination is carried out by making points P3 shown in FIG. 22 coincide with each other.

Further, basic constitutions of 3 sheets of the flexible boards 21 are the same. Therefore, the first flexible board 22 will be explained in details. Further, according to 18 pieces of the covers 12, respective 6 pieces thereof are fixed to 3 sheets of the flexible boards 21.

Figure 23:
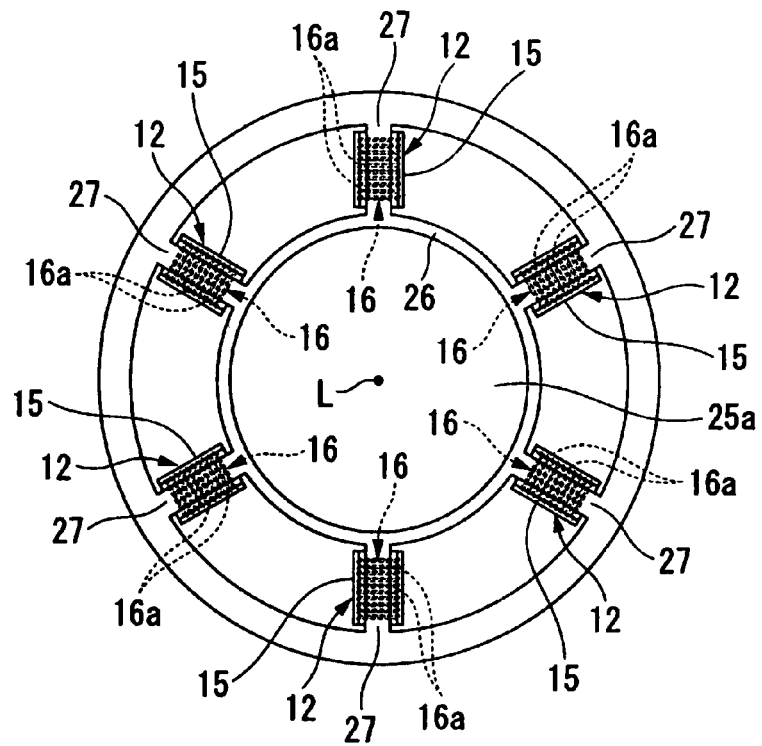
FIG. 23 is a top view of a first flexible board shown in FIG. 22.

As shown by FIG. 22 and FIG. 23, the first flexible board 22 is constituted by a board main body 25, a ring 26, a connecting portion 27. The board main body 25 is formed with a through hole 25a a diameter of which is substantially the same as an inner diameter of the core back 11a substantially at a center position. Further, the board main body 25 of the embodiment is formed by a ring-like shape.

Further, inside of the through hole 25a is formed with the rings 26 formed to laminate the front end portions 11c of 18 pieces of the teeth 11b. The ring 26 is connected to the board main body 25 by the connecting portion 27 both ends of which are respectively connected to the ring 26 and the board main body 25. Further, the board main body 25, the ring 26 and the connecting portion 27 are formed integrally by a base member having a flexibility (for example, a layer or the like Of polyimide, liquid crystal polymer or the like).

6 of the connecting portions 27 are formed to laminate the teeth 11b by being spaced apart from each other by every 2 thereof in 18 pieces of the teeth 11b. Further, the cover 12 is fixed to a lower face of the connecting portion 27'.

Further, the second flexible board 23 is constructed by a constitution the same as that of the first flexible board 22, and therefore, a detailed explanation thereof will be omitted.

However, as shown by FIG. 22, when the second flexible board 23 is laminated to the first flexible board 22 by making the points P3 coincide with each other, positions thereof forming the connecting portions 27 differ from those of the first flexible board 22. That is, the second flexible board 23 is formed with the connecting portions 27 to laminate the teeth 11b at positions phases of which are shifted from those of the teeth 11b laminating the connecting portions 27 of the first flexible board 22 by 1 slot in 18 pieces of the teeth 11b.

Further, the third flexible board 24 is constructed by a constitution the same as that of the first flexible board 22 similar to the second flexible board 23, and therefore, a detailed explanation thereof will be omitted. However, positions of forming the connecting portions 27 of the third flexible board 24 differ from those of the second flexible board 23 when the third flexible board 24 is laminated to the second flexible board 23 by making the points P3 coincide with each other. That is, the third flexible board 24 is formed with the connecting portions 27 to be laminated to the teeth 11b at positions phases of which are shifted from those of the teeth 11b laminated to the connecting portions 27 of the second flexible boards 23 by 1 slot in 18 pieces of the teeth 11b.

Next, a method of fabricating the stator 20 of the embodiment will be explained as follows. Further, although the method of fabricating the stator 20 of the embodiment is constituted by a method basically the same as that of the first embodiment, an explanation will be given centering on a different portion.

First, the base board 10 is prepared by carrying out the base board working step and the stator core 11 is prepared by carrying out the stator core forming step and the layer coating step. However, in the step of forming the stator core 11 the teeth 11b are formed by 18 pieces thereof constituting a multiple of 3.

Successively, after forming 18 pieces of the covers 12 by the base member working step, the cover fixing step is carried out. That is, after preparing the flexible board 21 comprising the first flexible board 22, the second flexible board 23 and the third flexible board 24 by working a base member having a flexibility, respective 6 pieces of the covers 12 are fixed to the respective connecting portions 27 of 3 sheets of the flexible boards 22, 23, 24.

Successively, after laminating the stator core 11 successively from the first flexible board 22, there is carried out the bonding step of bonding the cover 12 to the base board 10.

First, the first flexible board 22 is laminated to the stator core 11 to interpose the stator core 11 between the first flexible board 22 and the base board 10. At this occasion, the connecting portions 27 of the first flexible board 22 are fixed with 6 pieces of the covers 12, and therefore, the covers 12 can be fitted to 6 pieces of the teeth 11b efficiently and successively. That is, different from the case of the first embodiment, it is not necessary to fit the respective covers 12 thereto one by one, and therefore, the covers 12 can be fitted, thereto further efficiently and shortening of time can be achieved.

Further, when the first flexible board 22 is laminated to the stator core 11, there is brought about a state of laminating the core back 11a and the board main body 25, laminating the front end portion 11c and the ring 26, and laminating the tooth 11b and the connecting portion 27. That is, the stator core 11 is brought into a state of being fixed by being interposed between the first flexible board 22 and the base board 10 over entire ranges of the core back 11a, the teeth 11b and the front end portions 11c.

Successively, the second flexible board 23 is laminated to the first flexible board 22. At this occasion, the connecting portion 27 of the second flexible board 23 is shifted from the connecting portion 27 of the first flexible board 22 by 1 slot in a phase thereof, and therefore, the connecting portions 27 are not laminated to each other. Therefore, the cover 12 fixed to the connecting portion 27 of the second flexible board 23 can firmly be fitted to the tooth 11b.

Successively, the third flexible board 24 is laminated to the second flexible board 23. Further, the cover 12 fixed to the connecting portion 27 of the third flexible board 24 is similarly fitted to the tooth 11b.

Thereby, the covers 12 can be fitted to all of 18 pieces of the teeth 11b of the stator core 11. Further, finally, the coil pattern 13 and the conductive pattern 16 are electrically connected while bonding all of the covers 12 to the base board 10 by soldering or the like. As a result, the stator 20 can be fabricated.

Further, when the respective flexible boards 22, 23, 24 are laminated, only the covers 12 fixed to the respective flexible boards 22, 23, 24 may separately be bonded thereto instead of summarizingly bonding the covers 12 finally.

Particularly, according to the embodiment, as described above, the covers 12 can be fitted to the tooth 11b in a short period of time, and therefore, the stator is facilitated to fabricate and a fabrication time period can be shortened. Further, 3 sheets of the flexible boards 22, 23, 24 of the base board 10 can be fixed by interposing the stator core 11 therebetween, and therefore, the respective teeth 11b and the respective front end portions 11c can integrally and solidly be connected by way of 3 sheets of the flexible boards 22, 23, 24 and the base board 10. Therefore, it can firmly be prevented that the respective teeth 11b are vibrated by being influenced by rotation of the permanent magnet 5.

Further, the flexible boards 21 are constituted by 3 sheets thereof, and therefore, three phase alternating currents can be supplied in a state in which the conductive pattern 16 of the cover 12 fixed to the first flexible board 22 is used exclusively for U phase, the conductive pattern 16 of the cover 12 fixed to the second flexible board 23 is used exclusive for V phase, the conductive pattern 16 of the cover 12 fixed to the third flexible board 24 is used exclusively for W phase. In this way, the respective flexible boards 21 can respectively be constituted by boards exclusive for U phase, V phase, W phase.

Further, although according to the second embodiment, an example is taken by a case of adopting the flexible boards 21 constituted by 3 sheets of boards of the first flexible board 22, the second flexible board 23 and the third flexible board 24, the invention is not limited to the case. For example, a sheet of the flexible board may be formed with 18 pieces of the connecting portions 27 and the covers 12 may be fixed to the connecting portions 27. However, by dividing the board into 3 sheets of the flexible boards 22, 23, 24 as in the second embodiment, the boards exclusive for U phase, V phase, W phase can be constituted, and therefore, the constitution is further preferable.

Further, the constitution of 3 sheets of the flexible boards 22, 23, 24 is preferable in a point described below.

That is, when the number of the teeth 11b (slot number) is as large as 18 pieces, or the slot number is intended to be constituted by a larger number, also numbers of the connecting portions 27 and the covers 12 are increased in accordance therewith. Therefore, when the number is intended to be dealt with by one sheet of the flexible board, an interval between the contiguous connecting portions 27 is narrowed, and there is brought about a drawback that the covers 12 are laminated to each other in a state before folding to form the covers 12 (developed shape).

In this respect, when the flexible boards are constituted by 3 sheets thereof, the interval between the connecting portions 27 can be spaced apart from each other, it is not necessary to be concerned with the above-described problem. Thereby, the constitution by 3 sheets of the flexible boards 22, 23, 24 is further preferable. Further, the problem becomes significant by an increase in the slot number.

Figure 24:
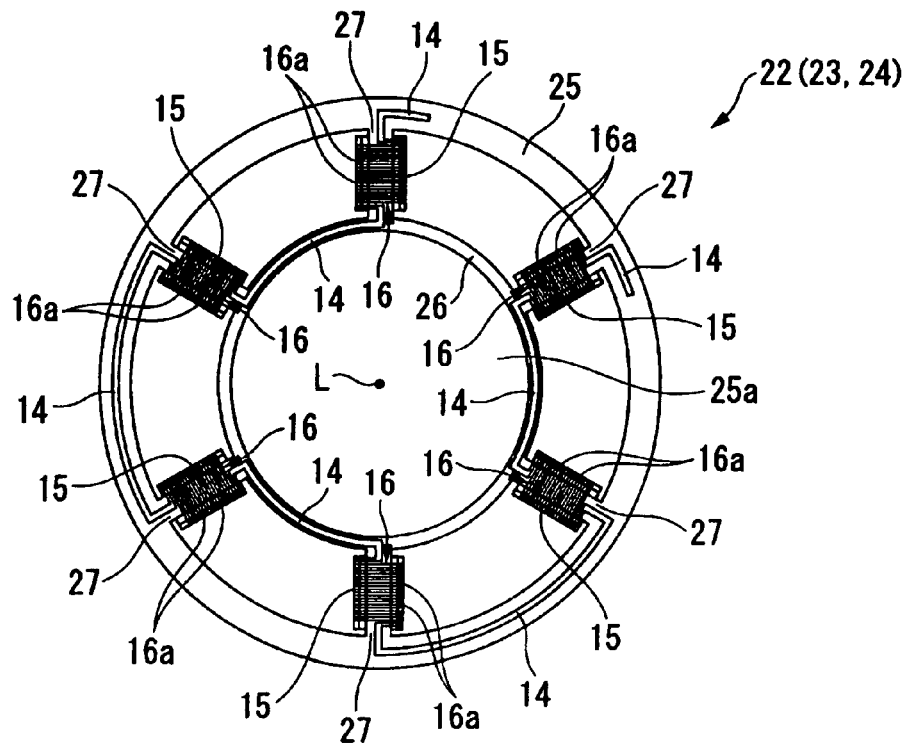
FIG. 24 is a view showing a modified example of each flexible board and is a top view of a flexible board in which a connection wiring is patterned.

Further, according to the above-described second embodiment, as shown by FIG. 24 (in order to facilitate to view the drawing, the drawing is illustrated in a state of constituting the conductive pattern 16 and the connection wiring 14 by bold lines), the connection wirings 14 for supplying currents respectively to the coil pattern 13 and the conductive pattern 16 may be provided on the sides of the respective flexible boards 22, 23, 24 instead of on the side of the base board 10. Even in this case, an effect similar to the above-described operation and effect can be achieved.

Further, in this case, when the connection wiring 14 is patterned, the connection wiring 14 can easily be patterned without taking other phase into a consideration. That is, when the connection wirings 14 of U phase, V phase, W phase are patterned on one sheet of the flexible board, it is necessary to pattern the wirings so as not to be electrically brought into contact with each other, and therefore, there is a concern of complicating the wirings, or laminating the wirings to be disconnected or short circuited. However, the connection wirings 14 are divided into 3 sheets of the flexible boards 22, 23, 24, and therefore, there is not a possibility of the drawback and the connection wirings 14 can easily and firmly be patterned for respective phases.

Further, although according to the second embodiment, an explanation has been given by taking an example of the case of fixing the covers 12 to the connecting portions 27 of the flexible board 22, 23, 24, the invention is not limited thereto but the flexible boards 22, 23, 24 and the covers 12 may integrally be formed. A specific explanation will be given of a method of fabricating the stator 20 in this case as follows.

First, the base board 10 is prepared by carrying out the base board working step and the stator core 11 formed with 18 pieces of the teeth 11b is prepared by carrying out the stator core forming step and the layer coating step.

Successively, there is prepared the first flexible board 22 integrally formed with the covers 12 by the base member working step. Specifically, first, the flexible board 22 constituted by the board main body 25 and the ring 26 and the connecting portion 27 are formed by an insulating base member. In this case, a size of the connecting portion 27 is adjusted such that a width of a portion excluding a portion of connecting the board main body 25 and the ring 26 becomes a width before folding to form the cover 12 (width in developed state). That is, a portion of the connecting portion 27 is made to serve as the base member 15 of the cover 12.

Successively, after patterning the conductive pattern 16 at the lower face of the connecting portion 27, the portion of the connecting portion 27 made to serve as the base member 15 is folded to form. As a result, the first flexible board 22 integrally formed with the connecting portion 27 and the cover 12 can be provided. Further, similarly, the second flexible board 23 and the third flexible board 24 are prepared.

Further, by carrying out the bonding step similar to the second embodiment, the stator 20 including 3 sheets of the flexible boards 22, 23, 24 integrally formed with the covers 12 and the connecting portions 27 can be fabricated. Even in the case of the fabricating method, operation and effect similar to those of the second embodiment can be achieved.

In addition thereto, according to the fabricating method, it is not necessary to fix the cover 12 at a later stage, and therefore, there is not brought about a positional shift between the connecting portion 27 and the cover 12. Therefore, the cover 12 can highly accurately be fitted to the tooth 11b, and higher quality formation can be achieved. Further, the cover fixing step can be omitted, and therefore, the fabrication time period can be shortened and the fabrication can further efficiently be carried out.

Further, the technical range of the invention is not limited to the above-described embodiments but can variously be modified within the range not deviated from the gist of the invention.

For example, although an explanation has been given by taking an example of the stator core 11 formed with 18 pieces of the teeth 11b in the above-described embodiments, the number of the teeth 11b is not limited to that of the case. Further, although the hub 4 is rotatably supported by the hydraulic dynamic pressure bearing 3, the bearing can also be constituted by a bearing for simply rotatably supporting the hub 4 without utilizing the dynamic pressure.

Further, although according to the respective embodiments, an example is taken by the case of combining the coil pattern 13 patterning the wiring 13a skewedly to the radius direction directed to the permanent magnet 5 and the conductive pattern 16 patterning the wiring 16a to be orthogonal to the radius direction directed to the permanent magnet 5, the invention is not limited to the case but the pattern shape may be reversed. That is, the conductive pattern 16 patterning the wiring 16a skewedly to the radius direction directed to the permanent magnet 5 and the coil pattern 13 patterning the wiring 13a orthogonally to the radius direction directed to the permanent magnet 5 may be combined.

However, the respective wiring patterns of the coil pattern 13 and the conductive pattern 16 may freely be designed without being limited to the above-described patterns so far as when the coil pattern 13 and the conductive pattern 16 are combined, the patterns can spirally be wound around the surrounding of the tooth 11b.

Further, although according to the respective embodiments, an explanation has been given by constituting the spindle motor 2 as an inner rotor type, the invention is not limited to the case but the spindle motor 2 may be constituted by an outer rotor type. Here, an embodiment when the spindle motor 2 of the first embodiment is constituted by the outer rotor type will simply be explained in reference to the drawings.

Figure 25:
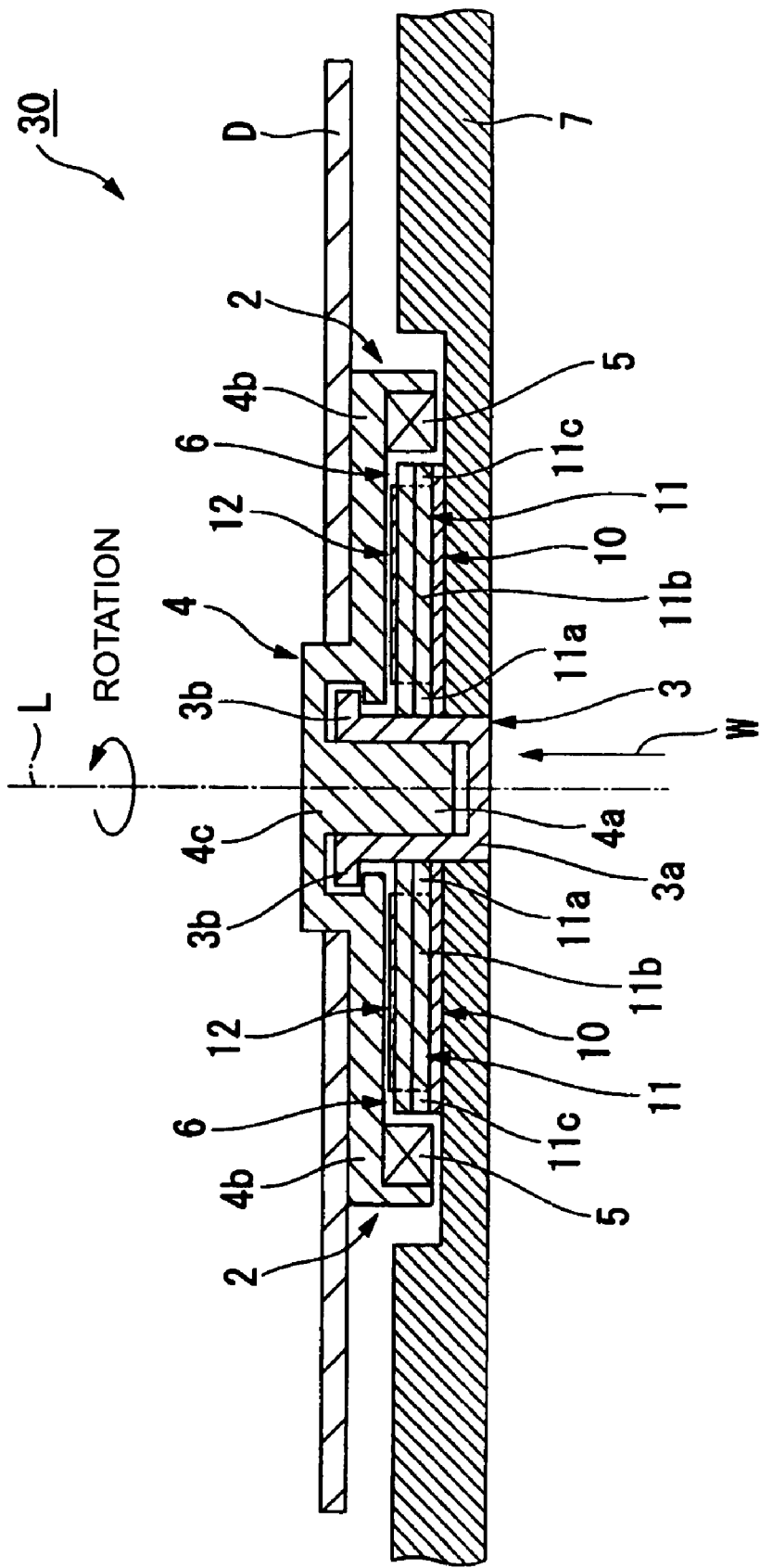
FIG. 25 is a view showing a modified example of a record medium drive apparatus according to the invention, and is a sectional view of a record medium drive apparatus including a spindle motor of an outer rotor type.

As shown by FIG. 25, the record medium drive apparatus 30 in this case includes the permanent magnet 5 arranged to surround the surrounding of the stator 6, and the stator 6 arranged oppositely to the permanent magnet 5 on an inner side of the permanent magnet 5, and is constituted such that the permanent magnet 5 is rotated around the axis line L on the outer side of the stator 6.

The permanent magnet 5 is held by the flange 4b of the hub 41 extended to the outer side of the stator 6 by exceeding the stator 6. Further, other constitution of the hub 4 and the constitution of the fluid dynamic pressure bearing 3 are similar to those of the first embodiment.

Figure 26:
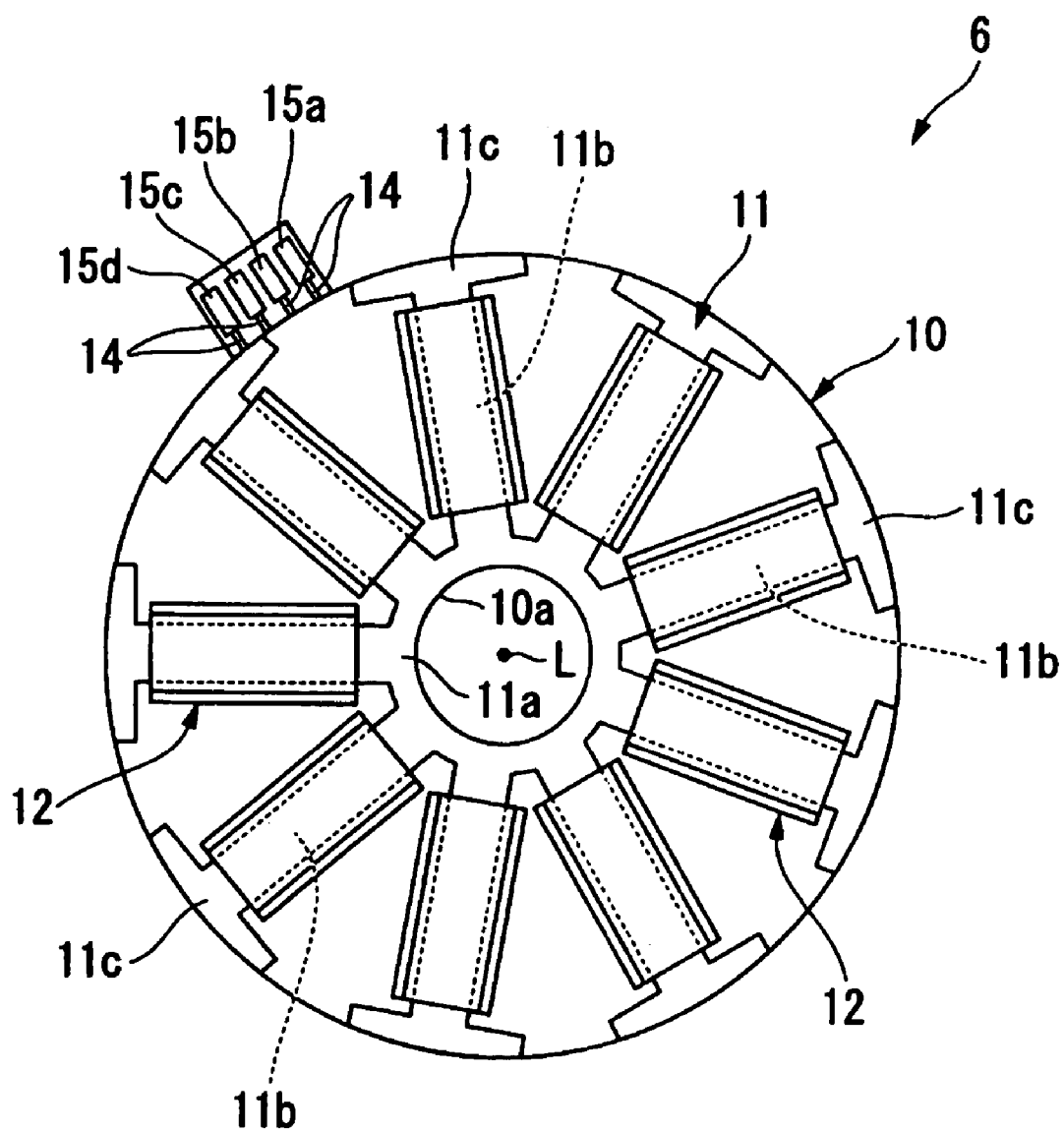
FIG. 26 is a top view of a stator constituting the record medium drive apparatus shown in FIG. 25.
Figure 27:
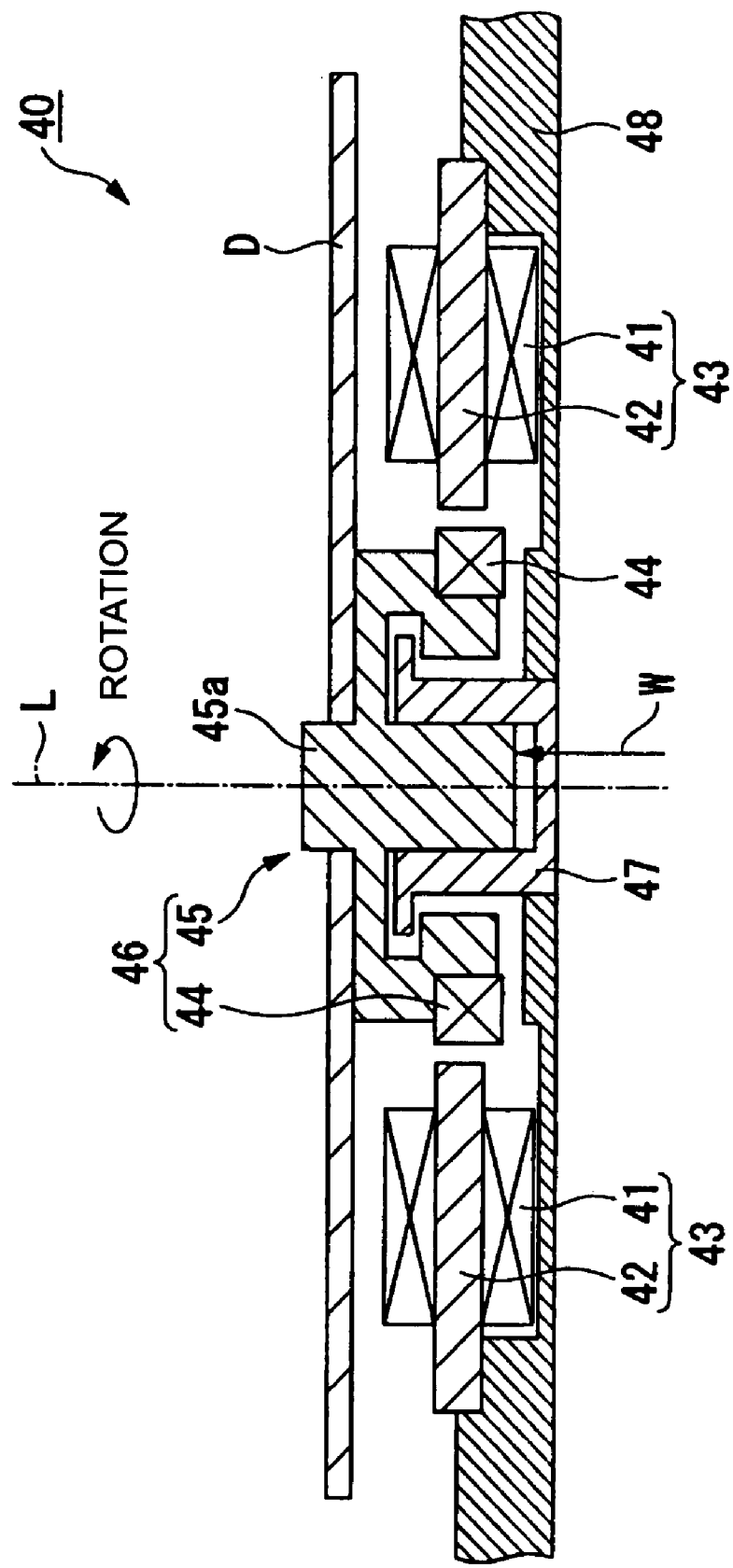
FIG. 27 is a sectional view showing an example of a disk drive apparatus of a related art.
Figure 28:
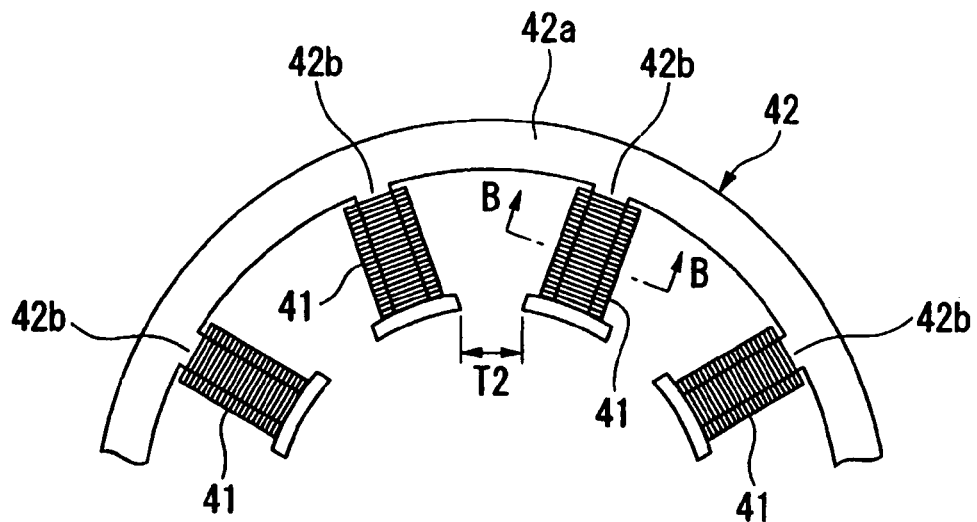
FIG. 28 is a top view of a stator core and a coil of the disk drive apparatus shown in FIG. 27.
Figure 29:
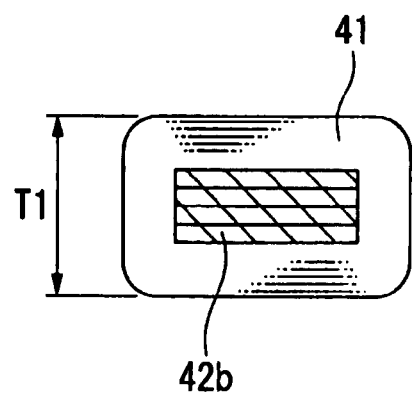
FIG. 29 is a view of a section shown in FIG. 28 taken along a line B-B.
Figure 30:
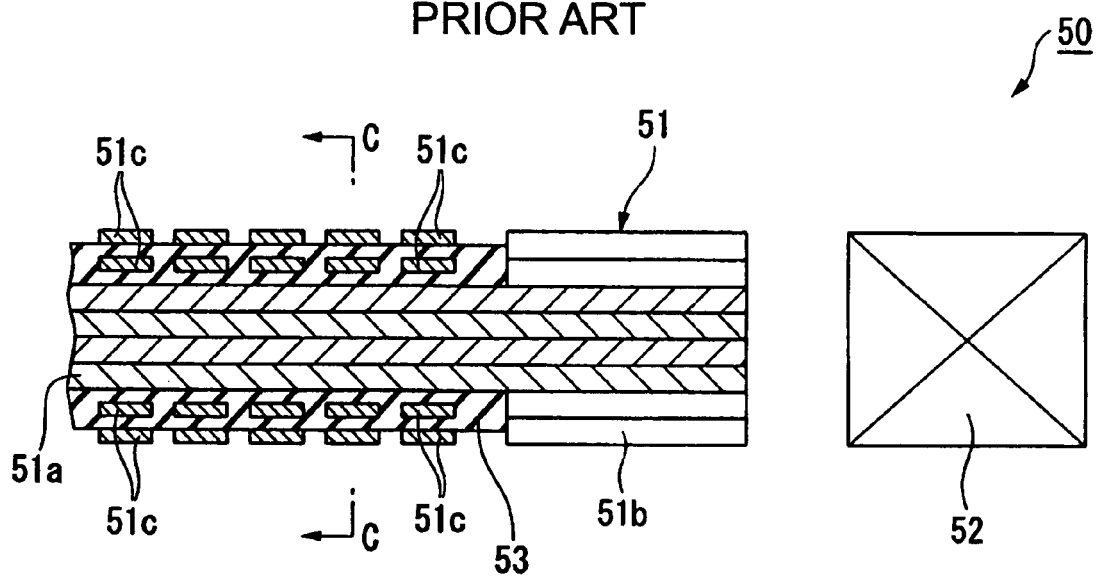
FIG. 30 is a sectional view showing other example of a disk drive apparatus of a related art.
Figure 31:
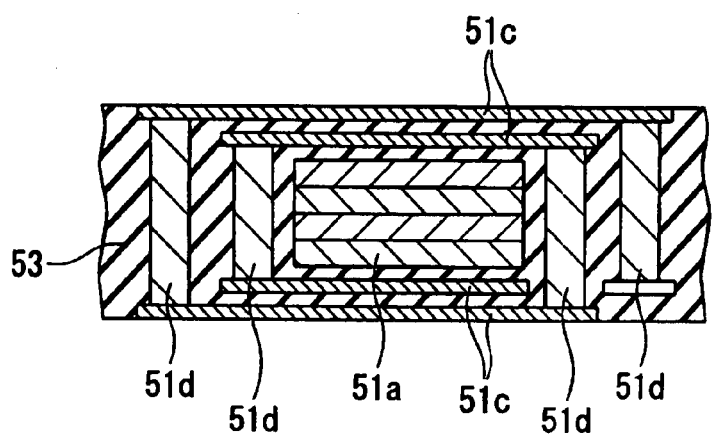
FIG. 31 is a view of a section shown in FIG. 30 taken along a line C-C.

The stator 6 is constituted by combining the base board 10, the stator core 11, and the cover 12 similar to the first embodiment, and is fixed in a state of being mounted on the base 7. However, as shown by FIG. 26, the base board 10 of the embodiment is formed with the through hole 10a to be inserted with the sleeve 3a at a center thereof. Thereby, as shown by FIG. 25, the stator 6 is arranged on the inner side of the permanent magnet 5 to surround the surrounding of the sleeve 3a.

Further, in FIG. 26, illustration of the connection wiring 14 formed on the base board 10 is partially omitted.

As shown by FIG. 26, the stator core 11 is formed such that the tooth 11b fixed to the core back 11a is extended to an outer side in the radius direction, and the front end of the tooth 11b constitutes the front end portion 11c opposed to the inner peripheral face (peripheral face) of the permanent magnet 5. Further, according to the embodiment, the example is taken by the case of forming 9 pieces (9 slots) of the teeth 11b at respective 40 degrees centering on the axis line L. Further, the constitution of the cover 12 is similar to that of the first embodiment.

The record medium drive apparatus 30 having the stator 6 constituted in this way differs in that the permanent magnet 5 is rotated on the outer side of the stator 6 and operation and effect similar to those of the first embodiment can be achieved with regard to the other point. Particularly, the flange 4b of the hub 4 can be formed to be long, and therefore, the hard disk D can further stably be held to achieve promotion of stability of rotation and reduction in vibration.

Further, although an explanation has been given by taking the example by the case of applying the spindle motor 2 of the first embodiment to the outer rotor type, even the spindle motor 2 of the other embodiment is applicable to the outer rotor type.

What is claimed is:

1. A stator which is a stator arranged oppositely to a permanent magnet rotated along an axis line, the stator comprising:
    an insulating base board;
    a plurality of conductive coil patterns patterned onto one face of the base board at respective angles centering on the axis line;
    a stator core of a magnetic member including a ring-like portion formed in a ring-like shape centering on the axis line, a plurality of teeth base ends of which are fixed to the ring-like portion and which are formed to extend in a radius direction directed to the permanent magnet at the respective predetermined angles, and front end portions respectively formed at front ends of the plurality of teeth and opposed to a peripheral face of the permanent magnet, wherein the coil patterns and the teeth are laminated on the base board to be opposed to each other;
    an insulating layer coated on an outer surface of the stator core; and
    covers including insulating base members bonded to the base board in a state of being respectively fitted to the plurality of teeth laminated on the base board and covering surroundings of the respective teeth and conductive patterns patterned to inner faces of the base members and electrically connected to the coil patterns.

2. The stator according to claim 1, wherein a pattern of one of the coil pattern or the conductive pattern is patterned such that respective electrically independent single pieces of wirings are aligned at constant intervals in the radius direction in a state of being skewed to the radius direction directed to the permanent magnet;
    wherein the other pattern is patterned such that respective electrically independent single pieces of wirings are aligned at constant intervals to the radius direction in a state of being orthogonal to the radius direction directed to the permanent magnet; and
    wherein both ends of respective wirings of the other pattern are electrically connected respectively to one ends and other ends of contiguous wirings of wirings of the one pattern.

3. The stator according to claim 1, further comprising:
    an insulating flexible board including a board main body formed with a through hole having a diameter substantially the same as an inner diameter of the ring-like portion, rings formed to be laminated to front end portions of the plurality of teeth, and a plurality of connecting portions both ends of which is connected to the board main body and the rings and which are formed to be laminated to the plurality of teeth for interposing the stator core between the flexible board and the base board;

wherein the cover is fixed to the connecting portion.

4. The stator according to claim 1, further comprising:
an insulating flexible board including a board main body formed with a through hole having a diameter substantially the same as an inner diameter of the ring-like portion, rings formed to be laminated to front end portions of the plurality of teeth, and a plurality of connecting portions both ends of which are connected to the board main body and the rings and which are formed to be laminated to the plurality of teeth for interposing the stator core between the flexible board and the base board;

wherein the cover is integrally formed with the connecting portion.

5. The stator according to claim 3, wherein the teeth are formed by a number of a multiple of 3 and the flexible board is constituted by 3 sheets of boards comprising a first flexible board, a second flexible board and a third flexible board;

wherein the first flexible board includes the connecting portions laminated to the teeth by being spaced apart from each other by every 2 thereof in the plurality of teeth;

wherein the second flexible board includes the connecting portions laminated to the teeth at positions phases of which are shifted from phases of the teeth laminated to the connecting portion of the first flexible board by one phase in the plurality of teeth; and wherein the third flexible board includes the connecting portions to be laminated to the teeth at positions phases of which are shifted from the teeth laminated to the connecting portions of the second flexible board by one phase in the plurality of teeth.

6. The stator according to claim 1, wherein the other face of the base board is formed with connection wirings for electrically connecting predetermined coil patterns in the plurality of coil patterns.

7. The stator according to claim 6, wherein a dummy pattern having a layer thickness substantially the same as a layer thickness of the connection wiring is formed on the other face of the base board over substantially an entire face thereof to fill spaces among the connection wirings.

8. A motor comprising:
the stator according to claim 1; and
an axis member rotatably supported around the axis line in a state of holding the permanent magnet.

9. A record medium drive apparatus comprising:
the motor according to claim 8;
a holding portion provided at a shaft member for holding a record medium capable of recording various information; and
a bearing for rotatably supporting the shaft member around the axis line.

10. A method of fabricating a stator which is a method of fabricating a stator opposedly arranged to a permanent magnet rotated around an axis line, the method comprising:
a base board working step of patterning a plurality of coil patterns on one face of an insulating base board at respective predetermined angles centering on the axis line by a conductive material;

a stator core forming step of forming a stator core including a ring-like portion formed in a ring-like shape centering on the axis line, a plurality of teeth base ends of which are fixed to the ring-like portion and which are formed to extend in a radius direction directed to the permanent magnet at the respective angles, and front end portions respectively formed at front ends of the plurality of teeth and opposed to a peripheral face of the permanent magnet by working a flat plate of a magnetic member;

a layer coating step of coating an insulating layer on an outer surface of the stator core;

a base member by a conductive material working step of patterning a conductive pattern electrically connected to the coil pattern on an insulating base member by a conductive material and folding to form the base member in a state of constituting an inner face by the conductive pattern to thereby form a cover for surrounding a surrounding of the tooth when the base member is fitted to the tooth;

a fixing step of fixing the base board and the stator core in a state of being laminated together such that the plurality of coil patterns and the plurality of teeth are opposed to each other; and a bonding step of fitting the cover to the tooth and electrically connecting the coil pattern and the conductive pattern while bonding the cover to the base board.

11. The method of forming a stator according to claim 10, wherein in carrying out the base board working step and the base member working step, either one pattern of the coil pattern and the conductive pattern is formed by patterning the pattern such that respective electrically independent single pieces of wirings are aligned at constant intervals to the radius direction in a state of being skewed to the radius direction directed to the permanent magnet;

wherein the other pattern is formed by patterning the other pattern such that respective electrically independent single pieces of the wirings are aligned at constant intervals to the radius direction in a state of being orthogonal to the radius direction directed to the permanent magnet; and wherein in the bonding step, both ends of the respective wirings of the other pattern are respectively electrically connected to one ends and other ends of contiguous wirings of the wirings of the one pattern.

12. The method of fabricating a stator according to claim 10, further comprising:
a cover fixing step of preparing an insulating flexible board including a board main body formed with a through hole having a diameter substantially the same as an inner diameter of the ring-like portion, rings formed to be laminated to front end portions of the plurality of teeth, and a plurality of connecting portions both ends of which are connected to the board main body and the rings and which are formed to be laminated to the plurality of teeth, and fixing the cover to the connecting portion;

wherein in the bonding step, the cover is bonded to the base board in a state of laminating the flexible board to the stator core such that the stator core is interposed between the flexible board and the base board.

13. The method of fabricating a stator according to claim 10, wherein in the base member working step, after forming a flexible board having a board main body formed with a through hole having a diameter substantially the same as an inner diameter of the ring-like portion, rings formed to be laminated to the front end portions of the plurality of teeth and a plurality of connecting portions both ends of which are connected to the board main body and the rings and which are formed to be laminated to the plurality of teeth from the insulating base member, the conductive pattern is patterned to the connecting portion and carrying out the folding forming to thereby integrally form the connecting portion and the covers;

wherein in the bonding step, the cover is bonded to the base board in a state of laminating the flexible board to the stator core such that the stator core is interposed between the flexible board and the base board.

14. The method of fabricating a stator according to claim 12, wherein in the stator core forming step, the teeth are formed by a number of a multiple of 3;

wherein in the cover fixing step, as the flexible board, there are prepared 3 sheets of boards comprising a first flexible board having the connecting portions laminated to the teeth by being spaced apart from each other by every 2 thereof in the plurality of teeth, a second flexible board having the connecting portions laminated to the teeth at positions phases of which are shifted from the teeth laminated to the connecting portions of the first flexible board by one thereof in the plurality of teeth, and a third flexible board having the connecting portions laminated to the teeth at positions phases of which are shifted from the teeth laminated to the connecting portions of the second flexible board by one thereof in the plurality of teeth and the covers are fixed to the connecting portions of the respective flexible boards; and wherein in the bonding step, after laminating the flexible boards to the stator core successively from the first flexible board, the cover is bonded to the base board.

15. The method of fabricating a stator according to claim 13, wherein in the stator core forming step, the teeth are formed by a number of a multiple of 3;

wherein in the press member working step, as the flexible board, there are prepared 3 sheets of boards comprising a first flexible board having the connecting portions laminated to the teeth by being spaced apart from each other by every 2 thereof in the plurality of teeth, a second flexible board having the connecting portions laminated to the teeth at positions phases of which are shifted from the teeth laminated to the connecting portions of the first flexible board by one thereof in the plurality of teeth, and a third flexible board having the connecting portion laminated to the teeth at positions phases of which are shifted from the teeth laminated to the connecting portions of the second flexible board by one thereof and the connecting portions and the covers of the respective flexible boards are integrally formed; and wherein in the bonding step, after laminating the flexible boards to the stator core successively from the first flexible board, the cover is bonded to the base board.

16. The method of fabricating a stator according to claim 10, wherein in the base board forming step, connection wirings for electrically connecting predetermined coil patterns of the plurality of coil patterns are formed on the other face of the base board.

17. The method of fabricating a stator according to claim 16, wherein in the base board forming step, a dummy pattern having a layer thickness substantially the same as a layer thickness of the connection wiring is formed over an entire face of the other face to fill spaces among the connection wiring.

* * * * *